US008786780B2

(12) United States Patent
Kurosaki

(10) Patent No.: US 8,786,780 B2
(45) Date of Patent: Jul. 22, 2014

(54) INFORMATION PROCESSING APPARATUS AND DISPLAY CONTROL METHOD

(71) Applicant: Sony Corporation, Tokyo (JP)

(72) Inventor: Daisuke Kurosaki, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/705,438

(22) Filed: Dec. 5, 2012

(65) Prior Publication Data
US 2013/0176492 A1 Jul. 11, 2013

(30) Foreign Application Priority Data

Jan. 5, 2012 (JP) ................................ 2012-000679

(51) Int. Cl.
| | |
|---|---|
| H04N 7/00 | (2011.01) |
| H04N 5/445 | (2011.01) |
| H04N 7/18 | (2006.01) |
| H04N 7/16 | (2011.01) |
| G05B 15/00 | (2006.01) |
| G06F 3/02 | (2006.01) |
| G09G 5/00 | (2006.01) |
| G06F 3/033 | (2013.01) |
| G09G 5/08 | (2006.01) |

(52) U.S. Cl.
USPC ............. 348/552; 348/563; 725/81; 725/141; 700/83; 345/168; 345/157

(58) Field of Classification Search
None
See application file for complete search history.

(56) References Cited

U.S. PATENT DOCUMENTS

| | | | | |
|---|---|---|---|---|
| 5,850,340 A | * | 12/1998 | York | 700/83 |
| 5,903,259 A | * | 5/1999 | Brusky et al. | 345/168 |
| 6,205,318 B1 | * | 3/2001 | Schindler et al. | 455/3.06 |
| 6,208,384 B1 | * | 3/2001 | Schultheiss | 348/552 |
| 6,249,914 B1 | * | 6/2001 | Harrison et al. | 725/141 |
| 6,285,406 B1 | * | 9/2001 | Brusky | 348/552 |
| 6,292,172 B1 | * | 9/2001 | Makhlouf | 345/157 |
| 6,377,861 B1 | * | 4/2002 | York | 700/83 |
| 7,116,376 B2 | * | 10/2006 | Yun | 348/552 |
| 7,266,835 B2 | * | 9/2007 | Halbert | 725/60 |
| 7,567,295 B2 | * | 7/2009 | Jan | 348/552 |
| 8,395,707 B1 | * | 3/2013 | Harvey et al. | 348/563 |
| 2004/0117835 A1 | * | 6/2004 | Lorkovic | 725/81 |
| 2007/0053513 A1 | * | 3/2007 | Hoffberg | 380/201 |
| 2010/0194976 A1 | * | 8/2010 | Smith et al. | 348/373 |

* cited by examiner

Primary Examiner — Jefferey Harold
Assistant Examiner — Sean Haiem
(74) Attorney, Agent, or Firm — Oblon, Spivak, McClelland, Maier & Neustadt, L.L.P.

(57) ABSTRACT

An apparatus includes: a first operating system configured to execute a first function; a second operating system configured to execute a second function; and a display controller configured to select one of first image information and second image information, the first image information being based on execution of the first function, the second image information being based on execution of the second function, or to superimpose one of the first image information and the second image information on the other information, and to display one of the selected information and the superimposed information on a display unit. The display controller is configured to display one menu when one of the first operating system and the second operating system is running, one of first icon and second icon being selectable from the menu, the first icon indicating start of the first function, the second icon indicating start of the second function.

20 Claims, 29 Drawing Sheets

| | OS 11 inputs currently-displayed image. | OS 12 inputs currently-displayed image. |
|---|---|---|
| OS 12 is running. | Pattern A:<br>Input from OS 12 is selected.<br>Selected function (application) is started. | Pattern B:<br>Selected function (application) is started. |
| OS 12 is not running. | Pattern C:<br>Input from OS 12 is selected.<br>OS 12 is started.<br>After that, selected function (application) is started. | Pattern D:<br>OS 12 is started.<br>After that, selected function (application) is started. |

INFORMATION PROCESSING APPARATUS AND DISPLAY CONTROL METHOD

BACKGROUND

The present disclosure relates to an information processing apparatus configured to process information. The present disclosure further relates to a display control method of controlling display.

Recently, all-in-one PCs (Personal Computers) are in widespread use. Frequently-used application software, peripheral devices, and the like are preinstalled in such an all-in-one PC.

Further, many types of this kind of PC include built-in television tuners, applications for watching television programs, and applications for recording television programs.

In the past, the following technology is proposed. A television tuner at a computer side sets a television channel. At this time, the television channel is set to a television tuner at a display device side (Japanese Patent Application Laid-open No. 2007-209015).

SUMMARY

However, in the past, there is known a composite-type computer system, in which two or more OSs (Operating Systems) are installed. A user wishes to start an application, which runs on one of the OSs. In this case, it is necessary to perform the following steps.

(1) To start an operation-target OS.
(2) To start a target application according to the procedure of the operation-target OS.

For example, a user starts an OS for TV (television) on a PC, and watches a program on TV. Then, the user wishes to start a DVD (Digital Versatile Disk) player on the PC, and to watch content in a DVD.

At this time, the following steps are executed. The user firstly starts an OS for PC once. Then, the user opens a remote control menu on the PC. Then, the user selects a DVD player.

In this manner, in the past, once one OS is started, it is difficult to start an arbitrary application on each OS seamlessly with simple operations. This system is not user friendly, which is problematic.

In view of the above-mentioned circumstances, it is desirable to provide a user-friendly information processing apparatus.

Further, it is also desirable to provide a user-friendly display control method.

According to an embodiment of the present invention, there is provided an information processing apparatus including a first operating system, a second operating system, and a display controller.

The first operating system is configured to execute a first function. The second operating system is configured to execute a second function. The display controller is configured to select one of first image information and second image information, the first image information being based on execution of the first function, the second image information being based on execution of the second function, or to superimpose one of the first image information and the second image information on the other information, and to display one of the selected information and the superimposed information on a display unit.

Further, the display controller is configured to display one menu when one of the first operating system and the second operating system is running, one of first icon and second icon being selectable from the menu, the first icon indicating start of the first function, the second icon indicating start of the second function.

According to the present technology, it is possible to improve user-friendliness.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 12 is a diagram showing operations in a case where a function is selected from the integrated function menu;

DETAILED DESCRIPTION OF EMBODIMENTS

Figure 1:
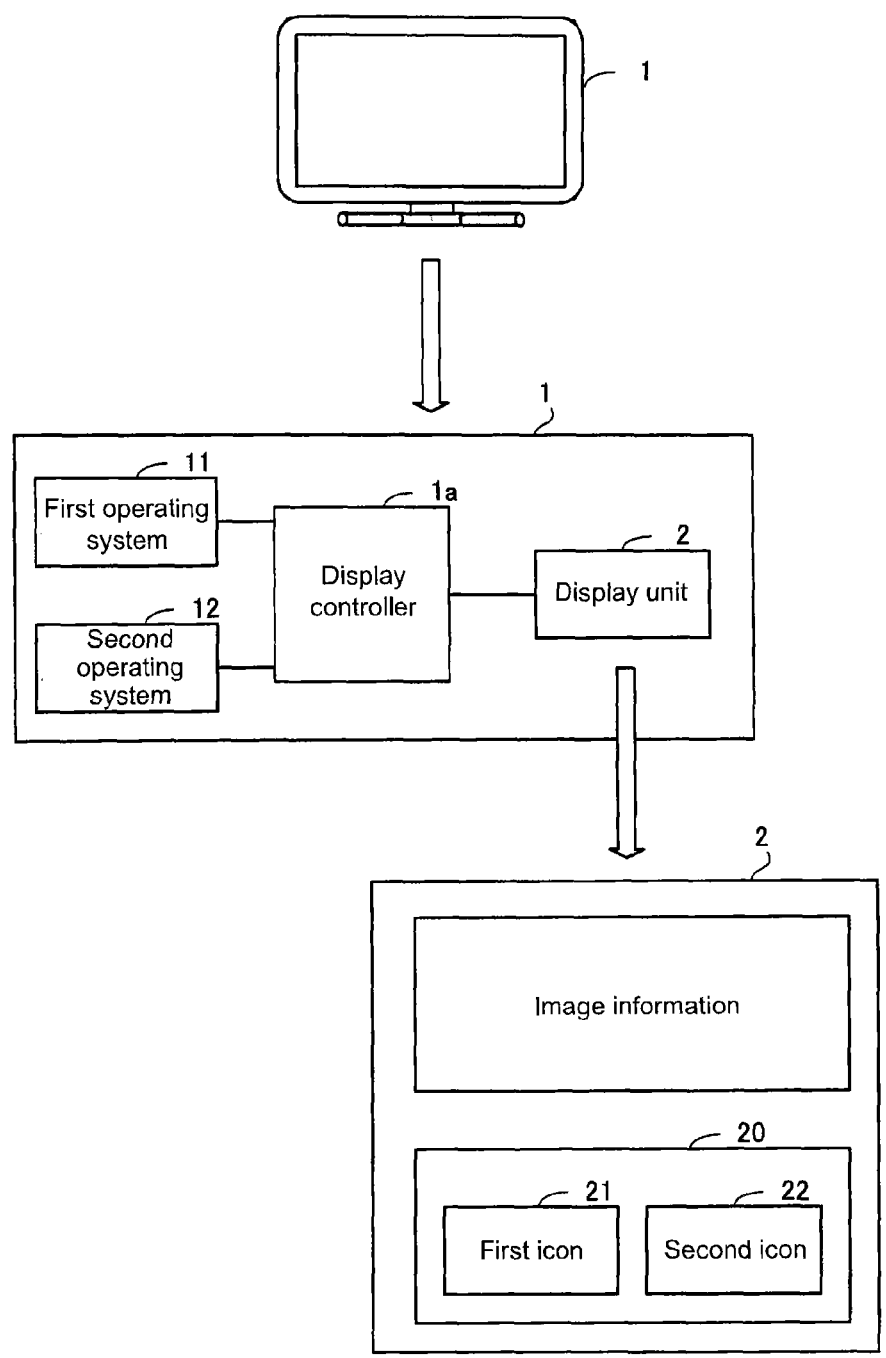
FIG. 1 is a diagram showing a configuration example of an information processing apparatus.

Hereinafter, an embodiment of the present disclosure will be described with reference to the drawings. FIG. 1 is a diagram showing a configuration example of an information processing apparatus. An information processing apparatus 1 includes a first operating system (the OS 11), a second operating system (the OS 12), a display controller 1a, and a display unit 2.

The OS 11 executes a first function (first application), for example, a TV function. An OS 12 executes a second function (second application), for example, a PC function.

The display controller 1a displays one of or both of first image information and second image information on the display unit 2. The first image information is created when the first function is executed. The second image information is created when the second function is executed.

Further, the display controller 1a displays one menu 20 on the display unit 2 during startup of the OS 11 or the OS 12. A user may select a first icon 21 or a second icon 22. The first icon 21 (for example, icon for TV function) shows startup of the first function. The second icon 22 (for example, icon for PC function) shows startup of the second function.

Further, in a case where the first icon 21 is selected, the display controller 1a displays the first image information. The first image information is created when the first function is executed. In a case where the second icon 22 is selected, the display controller 1a displays the second image information. The second image information is created when the second function is executed.

Figure 2:
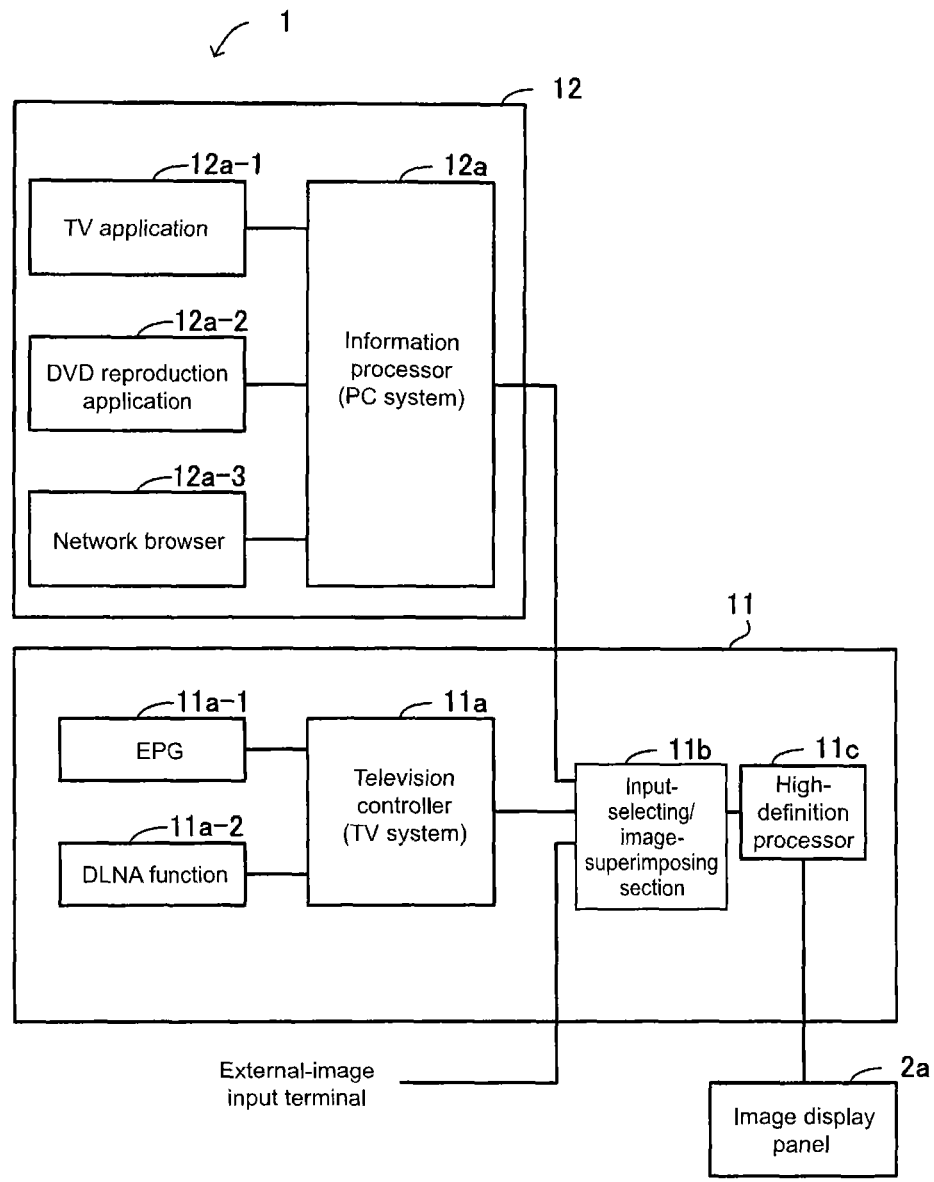
FIG. 2 is a diagram showing a configuration example of the information processing apparatus.

Next, the configuration of the information processing apparatus 1 will be described in detail. FIG. 2 is a diagram showing a configuration example of the information processing apparatus. The information processing apparatus 1 includes the OS 11, the OS 12, and an image display panel 2a as the display unit 2. The image display panel 2a (liquid crystal panel, etc.) displays images.

The OS 11 is an operating system such as, for example, Linux (registered trademark). The OS 11 executes a TV application as the first function. Further, the OS 11 includes a television controller 11a (TV system), an input-selecting/image-superimposing section 11b, and a high-definition processor 11c. Note that the input-selecting/image-superimposing section 11b also functions as the display controller 1a of FIG. 1.

The OS 12 is an OS such as, for example, Windows (registered trademark). The OS 12 executes a PC application as the second function. Further, the OS 12 includes an information processor 12a (PC system).

The television controller 11a executes the TV function. Applications such as, for example, an EPG 11a-1 for displaying TV EPGs and a DLNA (Digital Living Network Alliance) function 11a-2 are installed in the television controller 11a.

Note that the DLNA is a standard for connecting AV (Audio Video) devices, PCs, and information appliances via an in-home LAN (Local Area Network), and for using them in cooperation.

The information processor 12a executes various information-processing functions, and mainly functions as a PC. Applications such as, for example, a TV application 12a-1 at a PC side, a DVD reproduction application 12a-2, and a network browser 12a-3 are installed in the information processor 12a.

The input-selecting/image-superimposing section 11b selects images (first image information), images (second image information), or external images. Alternatively, the input-selecting/image-superimposing section 11b superimposes an image on another image. The images (first image information) are sent from the television controller 11a. The images (second image information) are sent from the information processor 12a. The external images are input from an external-image input terminal.

The high-definition processor 11c reconstructs images, which have been degraded. The high-definition processor 11c outputs high-definition images to the image display panel 2a. For example, the high-definition processor 11c corrects blurred outlines of objects, and corrects degradation of pixels. As a result, for example, the high-definition processor 11c reproduces the texture and details of original image signals to thereby make high-definition images. Note that a tone-correction processor (not shown) is provided on the output stage of the input-selecting/image-superimposing section 11b.

As described above, the information processing apparatus 1 includes the two or more OSs 11, 12, which output images. Both the OSs 11, 12 output images to the image display panel 2a (i.e., one display device) via the input-selecting/image-superimposing section 11b.

Here, the input-selecting/image-superimposing section 11b exclusively selects an image from a plurality of input images, and displays the selected image. In addition, the input-selecting/image-superimposing section 11b has a function of superimposing GUIs (Graphical User Interfaces) on each input image.

That is, the input-selecting/image-superimposing section 11b is capable of superimposing GUIs rendered by the OS 11 on an image output by the OS 12. Further, for example, the input-selecting/image-superimposing section 11b is capable of displaying small images in line, to thereby display a plurality of input images on a screen simultaneously (example of superimposing will be described later).

Figure 3:
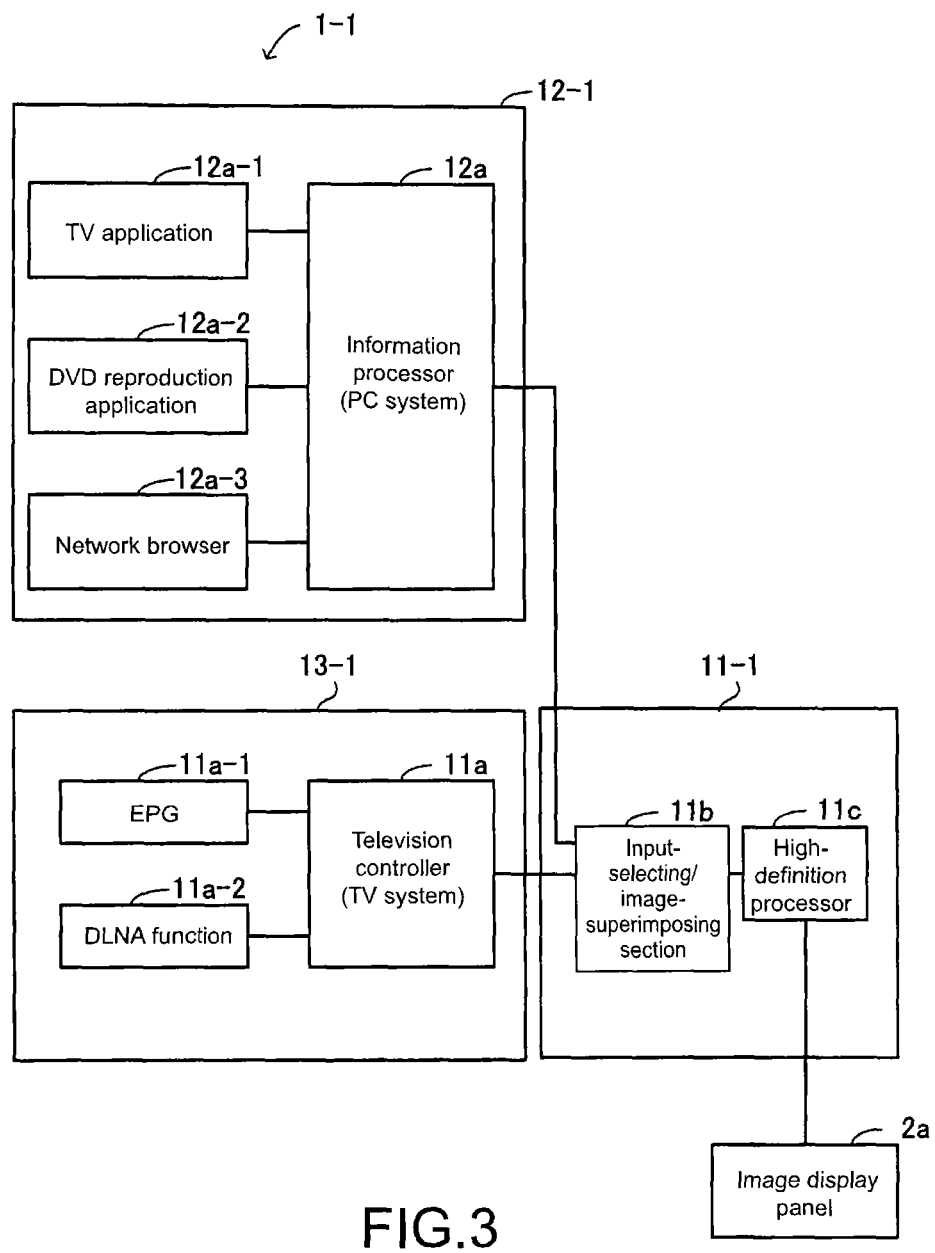
FIG. 3 is a diagram showing a configuration example of the information processing apparatus.

Next, modified examples of the configuration of the information processing apparatus 1 will be described. FIG. 3 is a diagram showing a configuration example of the information processing apparatus. An information processing apparatus 1-1 of a first modified example includes an OS 11-1, an OS 12-1, an OS 13-1, and the image display panel 2a for displaying images.

The OS 11-1 includes the input-selecting/image-superimposing section 11b and the high-definition processor 11c. The OS 12-1 includes the information processor 12a (PC system). The OS 13-1 includes the television controller 11a (TV system). Applications such as, for example, the EPG 11a-1 for displaying TV EPGs and the DLNA function 11a-2 are installed in the television controller 11a.

Further, the information processor 12a includes applications such as, for example, the TV application 12a-1, the DVD reproduction application 12a-2, and the network browser 12a-3, which are at the PC side. Note that how the respective components behave is similar to that of FIG. 2, and description thereof will thus be omitted.

As described above, in the information processing apparatus 1-1 of the first modified example, the OS 11-1 includes the input-selecting/image-superimposing section 11b and the high-definition processor 11c. The OS 13-1 includes the television controller 11a. The OS 11-1 and the OS 13-1 are independent from each other.

As described above, the input-selecting/image-superimposing section 11b and the television controller 11a may run on different OSs, respectively.

Figure 4:
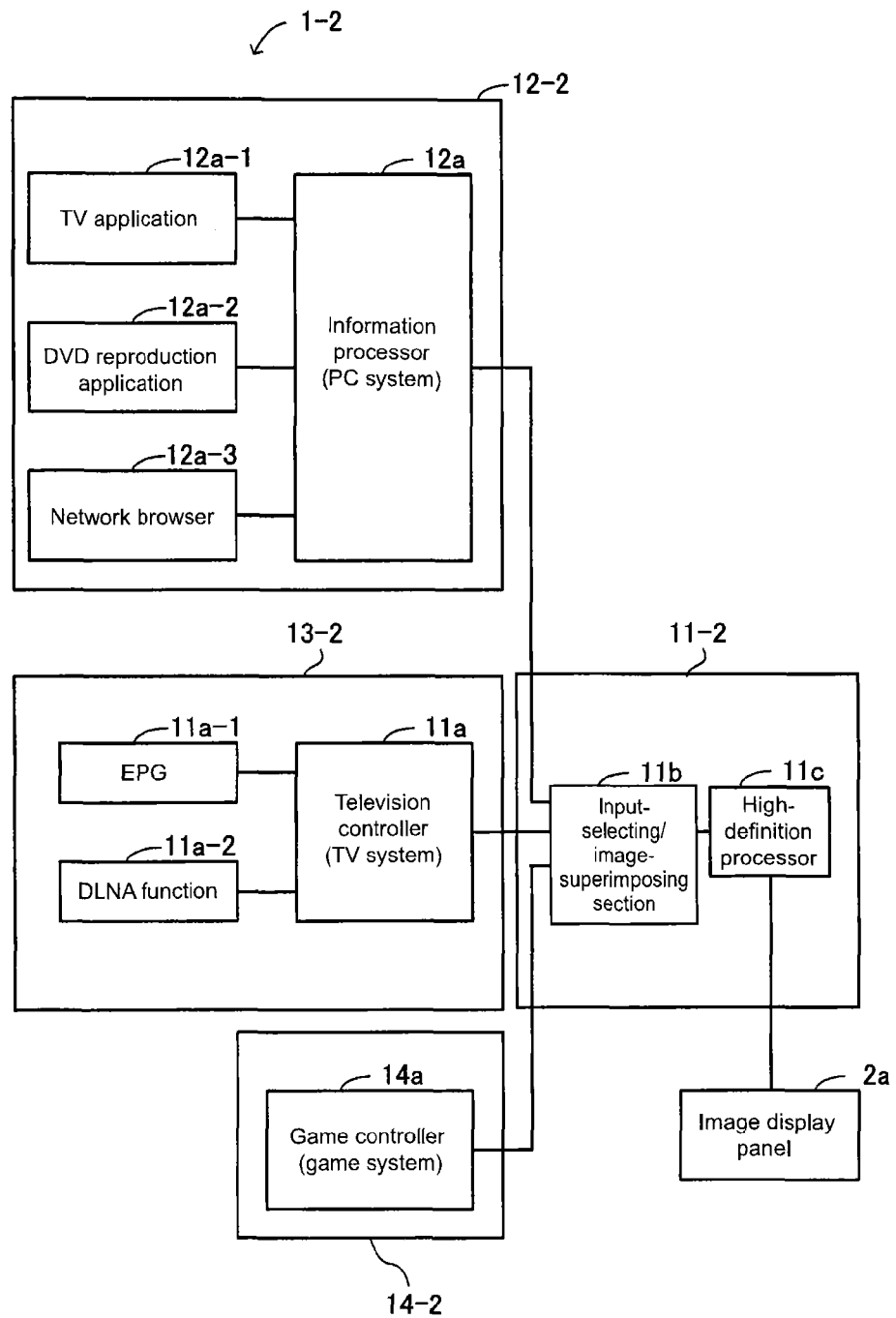
FIG. 4 is a diagram showing a configuration example of the information processing apparatus.

FIG. 4 is a diagram showing a configuration example of the information processing apparatus. An information processing apparatus 1-2 of the second modified example includes an OS 11-2, an OS 12-2, an OS 13-2, an OS 14-2, and the image display panel 2a for displaying images.

The OS 11-2 is an OS such as, for example, Linux. The OS 11-2 includes the input-selecting/image-superimposing section 11b and the high-definition processor 11c. The OS 12-2 is an OS such as, for example, Windows. The OS 12-2 includes the information processor 12a (PC system).

The OS 13-2 is an OS such as, for example, Linux. The OS 13-2 includes the television controller 11a (TV system). The OS 14-2 is an OS such as, for example, Linux. The OS 14-2 includes a game controller 14a (game system).

Applications such as, for example, the EPG 11a-1 for displaying TV EPGs and the DLNA function 11a-2 are installed in the television controller 11a. Further, applications such as, for example, the TV application 12a-1, the DVD reproduction application 12a-2, and the network browser 12a-3, which are at the PC side, are installed in the information processor 12a.

The game controller 14a starts the game application. Note that how the other respective components behave is similar to that of FIG. 2, and description thereof will thus be omitted.

As described above, in the information processing apparatus 1-2 of the second modified example, the input-selecting/image-superimposing section 11b selects images sent from the television controller 11a, images sent from the information processor 12a, or images sent from the game controller 14a. Alternatively, the input-selecting/image-superimposing section 11b superimposes an image on another image. In this manner, three or more OSs may input images in the input-selecting/image-superimposing section 11b.

Next, how to superimpose a GUI on an image will be described. FIG. 5 to FIG. 8 are diagrams showing examples of superimposing a GUI on an image. In FIG. 5 to FIG. 8, GUIs are displayed on hatching areas.

Figure 5:
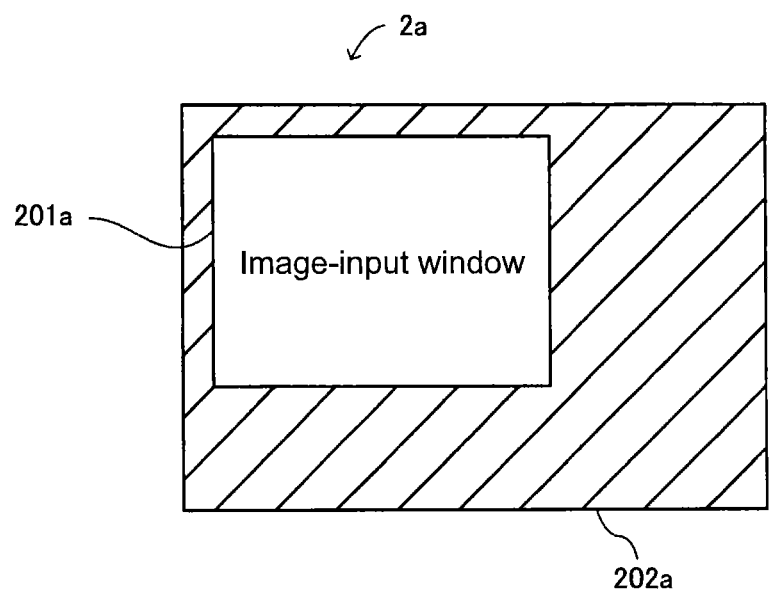
FIG. 5 is a diagram showing an example in which a GUI is superimposed on an image.

In FIG. 5, an image-input window 201a and a GUI 202a are displayed on the image display panel 2a. The GUI 202a (GUI includes menu 20 of FIG. 1) is superimposed on the image-input window 201a. In this case, the image-input window 201a is smaller than the original size, and the entire image is displayed.

Figure 6:
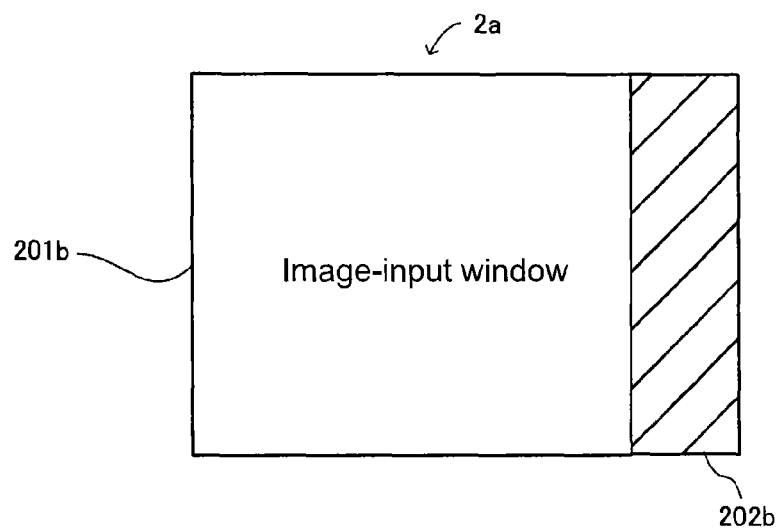
FIG. 6 is a diagram showing an example in which a GUI is superimposed on an image.

In FIG. 6, the image-input window 201b and the GUI 202b are displayed on the image display panel 2a. The GUI 202b is superimposed on the image-input window 201b. Specifically, the GUI 202b is superimposed on the input image in a manner that the GUI 202b covers part of the input image. In this example, the GUI 202b is displayed on the side of the screen. In this case, the GUI 202b, which is superimposed on part of the input image, may be rendered translucently.

Figure 7:
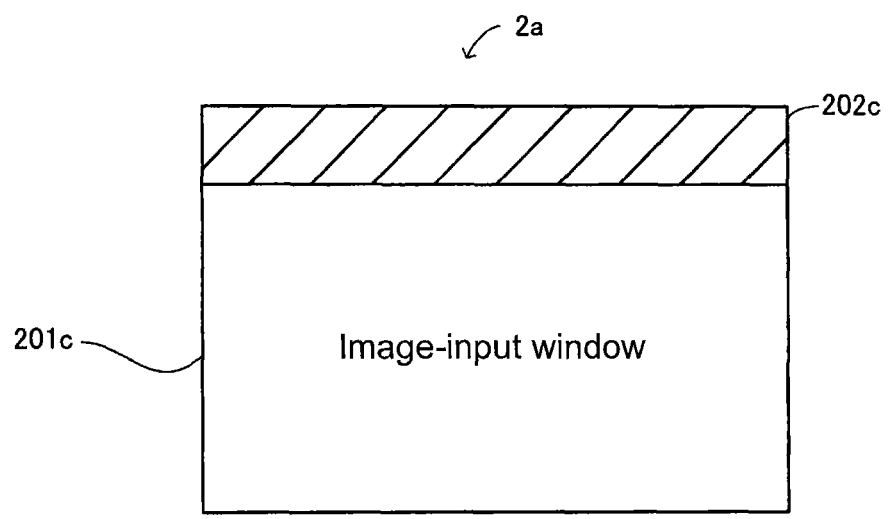
FIG. 7 is a diagram showing an example in which a GUI is superimposed on an image.

In FIG. 7, the image-input window 201c and the GUI 202c are displayed on the image display panel 2a. The GUI 202c is superimposed on the image-input window 201c. Specifically, the GUI 202c is displayed such that the GUI 202c is superimposed on the input image in a manner that the GUI 202c covers part of the input image. In this example, the GUI 202c is displayed on the upper side of the screen. In this case, the GUI 202c, which is superimposed on part of the input image, may be rendered translucently.

Figure 8:
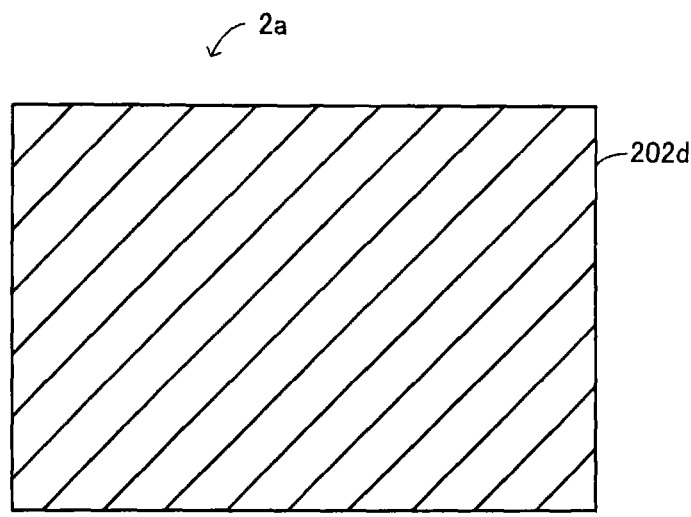
FIG. 8 is a diagram showing an example in which a GUI is superimposed on an image.

In FIG. 8, a GUI 202d is displayed on the image display panel 2a. That is, the GUI 202d is superimposed on an input image in a manner that the GUI 202d covers the entire image-input window.

In this manner, a GUI is displayed such that the GUI covers part of an input image. In addition, a GUI may be superimposed on an input image in a manner that the GUI covers the entire input image. Note that the GUI 202d, which is superimposed on the input image, may be rendered translucently. Note that the patterns of superimposing GUIs described above are merely examples. GUIs may be superimposed on an image arbitrarily.

Figure 9:
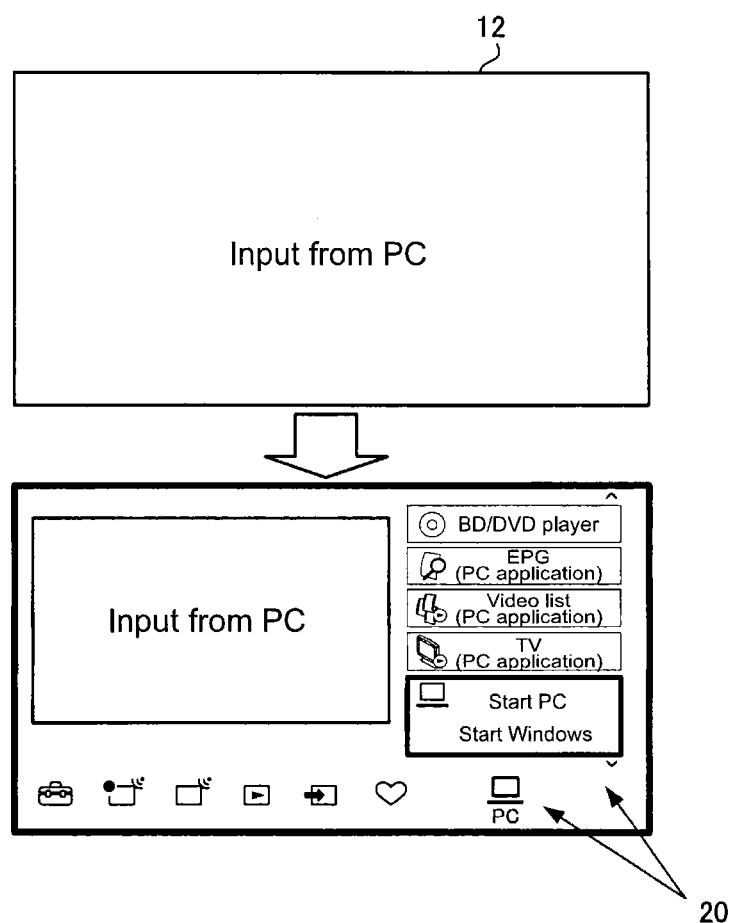
FIG. 9 is a diagram showing a menu superimposed on an image.
Figure 10:
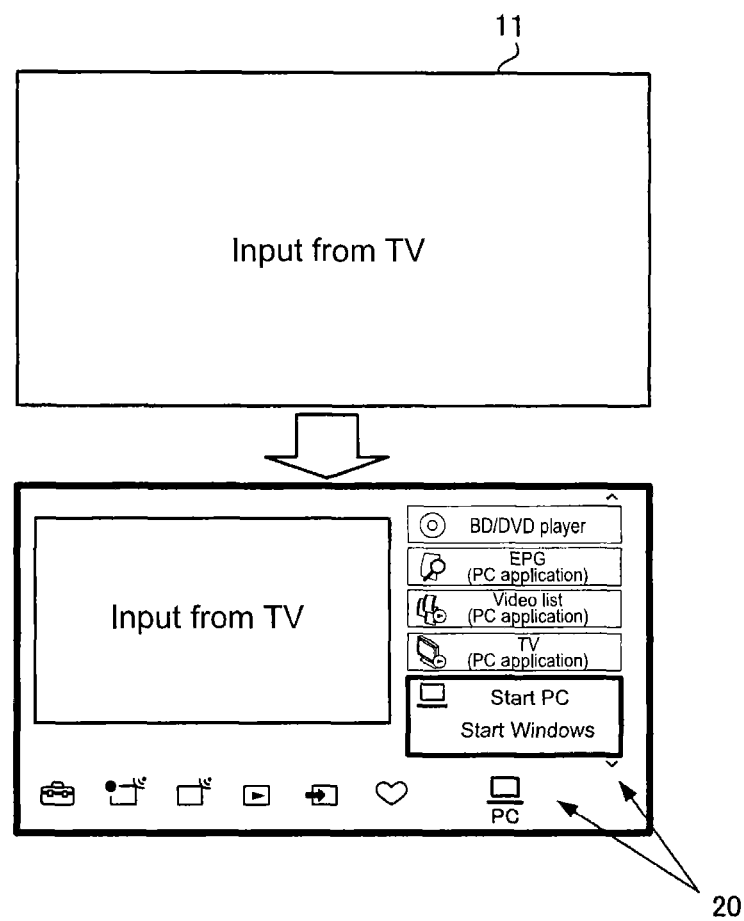
FIG. 10 is a diagram showing a menu superimposed on an image.

Next, the menu 20 for selecting a function will be described. The menu 20 is superimposed on a screen. FIG. 9 and FIG. 10 are diagrams each showing a menu, which is superimposed.

The OS 11 is configured to control the input-selecting/image-superimposing section 11b. The OS 11 renders the menu 20. The menu 20 is used to call functions installed in the entire information processing apparatus 1. Hereinafter, the menu is sometimes referred to as "integrated function menu". That is, since the OS 11 is configured to control the input-selecting/image-superimposing section 11b, the OS 11 renders the integrated function menu 20.

FIG. 9 shows a state where the integrated function menu 20 is displayed when image input from a PC is selected. The integrated function menu 20 includes icons displayed on a screen in a horizontal line, and icons displayed on the screen in a vertical line. The OS 11 renders the integrated function menu 20.

Further, FIG. 10 shows a state where the integrated function menu 20 is displayed when an image input from a TV is selected. The OS 11 renders the integrated function menu 20.

In this manner, even when an image input from the PC or the TV is selected, a user presses a predetermined button of a remote control, for example, and then the integrated function menu 20 is superimposed on the image. Further, a list of functions (applications), which run on a plurality of OSs, is displayed on the integrated function menu 20.

Note that the L-shape integrated function menu 20 is displayed. In the L-shape integrated function menu 20, function categories are displayed in a horizontal line (first-layer menu), and functions are displayed in a vertical line (second-layer menu). The first-layer menu and the second-layer menu surround a window. In FIG. 9 and FIG. 10, a PC function category is selected from the first-layer menu. In this situation, only PC functions are displayed in a vertical line, in this example. Note that the display is merely an example. The display mode of the integrated function menu 20 may be set arbitrarily.

Figure 11:
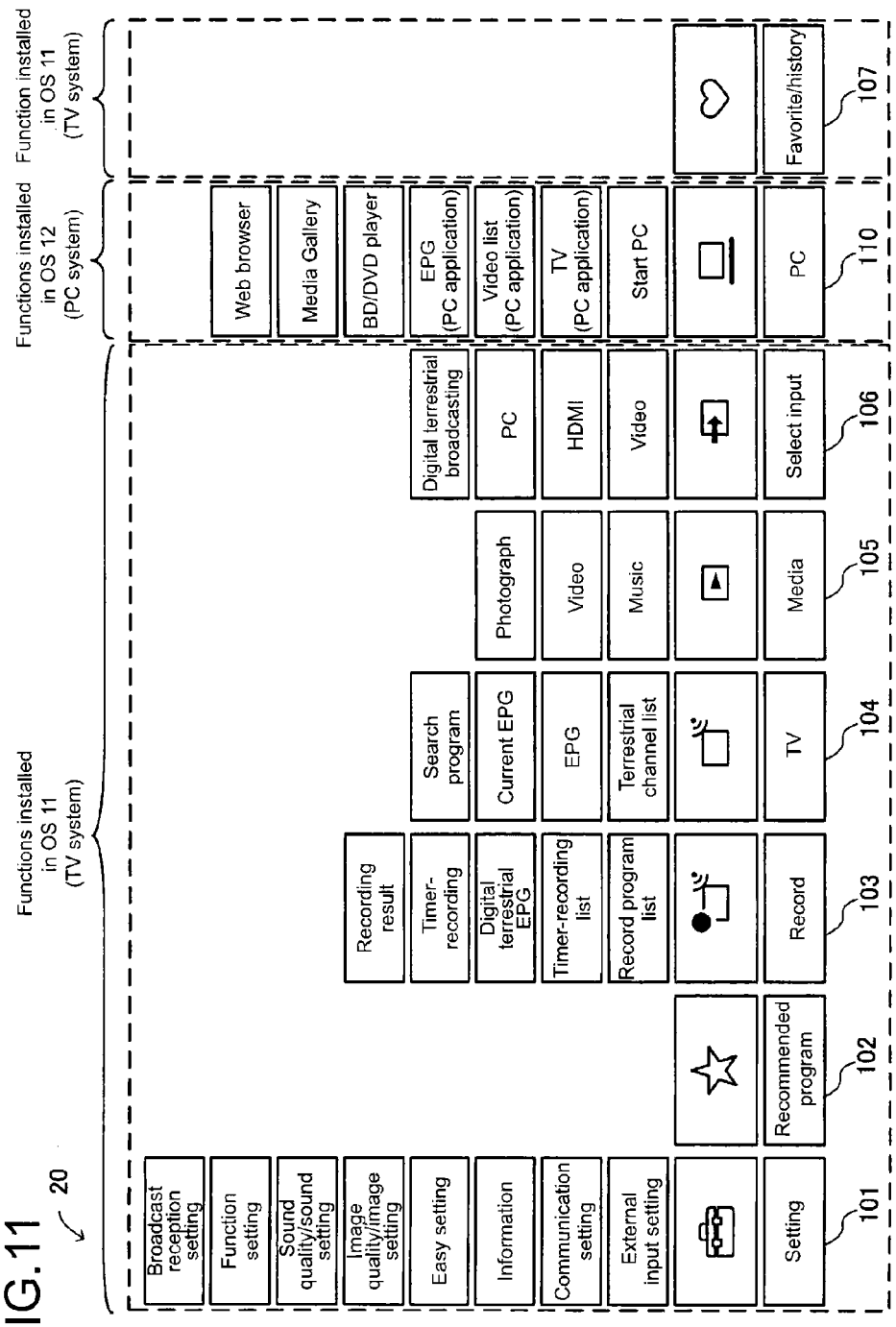
FIG. 11 is a diagram showing an example of an item list on an integrated function menu.

Next, items (icons) for the functions in the integrated function menu 20 will be described. FIG. 11 is a diagram showing an example of an item list in the integrated function menu.

The TV function category is selected from the first-layer menu. In this case, the following functions are displayed as TV functions installed in the OS 11. "Setting" 101, "recommended program" 102, "record" 103, "TV" 104, "media" 105, "select input" 106, and "favorite/history" 107 are displayed.

"Setting" 101 has a list of items "broadcast reception setting", "function setting", "sound quality/sound setting", "image quality/image setting", "easy setting", "information", "communication setting", and "external input setting".

"Recommended program 102" has a list of recommended programs. "Record" 103 has a list of items "recording result", "timer-recording", "digital terrestrial EPG", "timer-recording list", and "record program list".

"TV" 104 has a list of items "search program", "current EPG", "EPG", and "terrestrial channel list". "Media" 105 has a list of items "photograph", "video", and "music".

"Select input" 106 has a list of items "digital terrestrial broadcasting", "PC", "HDMI", and "video". "Favorite/history" 107 has a list of favorite menu items/recently-accessed menu items.

Meanwhile, "PC" 110 is displayed as the PC function installed in the OS 12. "PC" 110 has a list of items "web browser", "media gallery", "BD/DVD player", "EPG (PC application)", "video list (PC application)", "TV (PC application)", and "start PC".

Here, "web browser", "media gallery", and "BD/DVD player" of "PC" 110 are items for starting independent applications, respectively.

Further, "EPG (PC application)" and "video list (PC application)" are items for directly calling functions installed in one application. Further, "start PC" is an item for calling a function installed in the OS 12.

"Web browser" is a web-browser application, which runs on a PC. "Media gallery" is a multimedia-viewer application.

For example, "Media gallery" is an application for watching movie files, listening to music, and watching graphic slideshows.

"BD/DVD player" is an application for reproducing a BD (Blu-ray Disc)/DVD. "EPG (PC application)" is an EPG function installed in the TV application, which runs on a PC.

"Video list (PC application)" is a recorded-file-list function installed in the TV application, which runs on a PC. "TV (PC application)" is a function for watching TV, and is of the TV application, which runs on a PC. "Start PC" is an item on a desktop of Windows.

In this manner, in the integrated function menu, the TV function menu for the OS 11 and the PC function menu for the OS 12 are integrally displayed on one screen. Note that, as described above, functions for the information processor 12a (PC system) are displayed in the category "PC" 110. However, it is not necessary to sort displayed categories by OS type.

Further, the unit of function displayed on the integrated function menu 20 is not necessarily the process (application) unit. Further, one of a plurality of functions for one process (application) may be directly called.

Next, operations in a case where a function is selected from the integrated function menu 20 will be described. FIG. 12 is a diagram showing operations in a case where a function is selected from the integrated function menu.

A table T1 includes four patterns A to D. A user selects a function from the integrated function menu 20. In this case, one of the patterns A to D is executed according to "an OS which inputs a currently-displayed image" and "an operational status of an OS which has the selected function".

[Pattern A] The OS 11 inputs a currently-displayed image. The OS 12 is running. In this case, the input from the OS 12 is selected. The selected function is started.

[Pattern B] The OS 12 inputs a currently-displayed image. The OS 12 is running. In this case, the selected function is started.

[Pattern C] The OS 11 inputs a currently-displayed image. The OS 12 is not running. In this case, the input from the OS 12 is selected. The OS 12 is started. After that, the selected function is started.

[Pattern D] The OS 12 inputs a currently-displayed image. The OS 12 is not running. In this case, the OS 12 is started. After that, the selected function is started.

Figure 13:
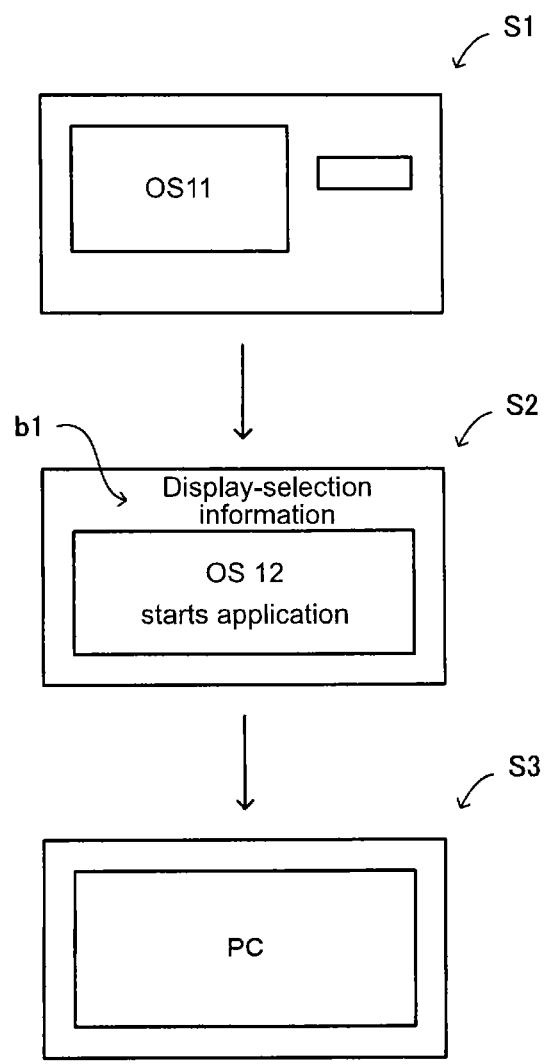
FIG. 13 is a diagram for explaining display-selection information.

Next, display-selection information will be described. FIG. 13 is a diagram for explaining display-selection information.

[S1] The OS 11 inputs a currently-displayed image (corresponding to pattern A or pattern C of FIG. 12).

[S2] The OS 12 starts an application. At this time, display-selection information b1 is displayed on an area, on which a GUI is superimposed.

[S3] After a predetermined time period (n seconds) passes, an image input from the OS 12 is displayed.

Figure 14:
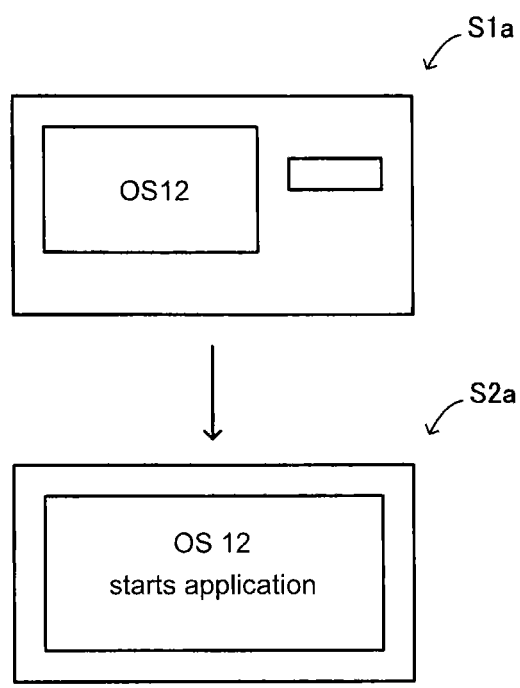
FIG. 14 is a diagram for explaining display-selection information.

FIG. 14 is a diagram for explaining display-selection information.

[S1a] The OS 12 inputs a currently-displayed image (corresponding to pattern B or pattern D of FIG. 12).

[S2a] The OS 12 starts an application. The display-selection information b1 is not displayed because a window for another OS is not to be displayed (i.e., screen transition does not result from change of input).

According to the information processing apparatus 1 of this technology, a user is capable of seamlessly starting a function running on another OS. Because of this, a user may not recognize that. In view of this, when a user operates the information processing apparatus 1 to select a new OS, the display-selection information b1 is superimposed on part of a screen. As described above, the display-selection information b1 is a banner for informing a user that a newly-selected OS is to be started.

In this manner, image-screen transition, which requires change of input, is executed. In this case, it is possible to reliably inform a user that an image screen is changed now. As a result, it is possible to increase user-friendliness.

Figure 15:
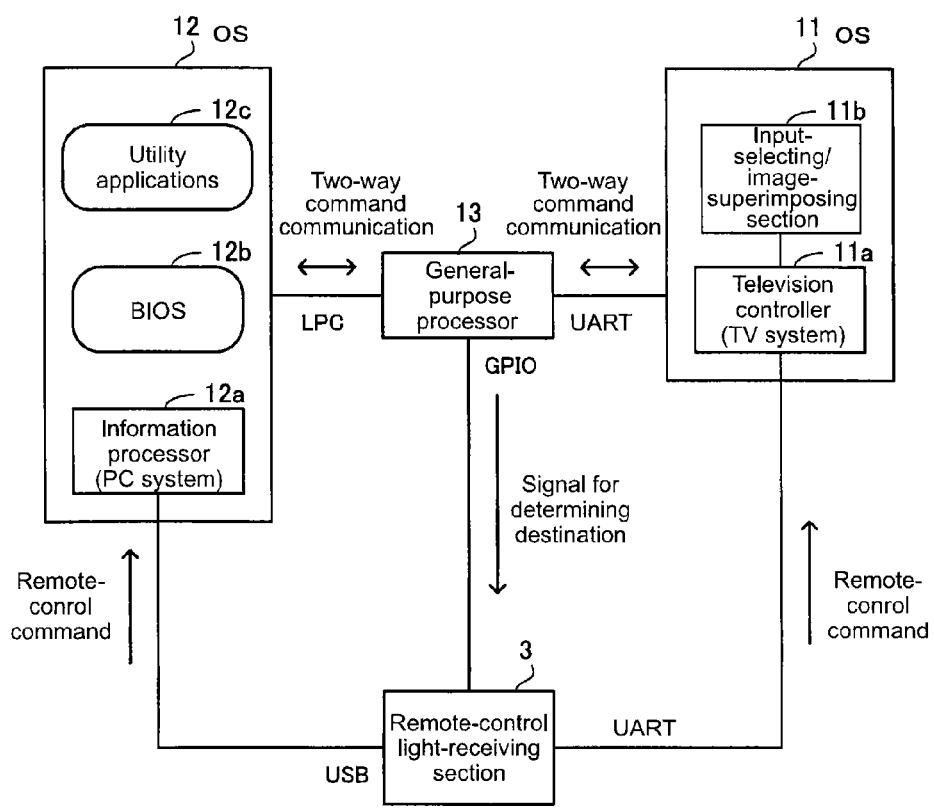
FIG. 15 is a diagram showing a control system of the information processing apparatus.

Next, a control system of the information processing apparatus 1 will be described. FIG. 15 is a diagram showing a control system of the information processing apparatus.

The control system of the information processing apparatus 1 includes the OS 11, the OS 12, a general-purpose processor 13, and a remote-control light-receiving section 3. The OS 11 includes the television controller 11a and the input-selecting/image-superimposing section 11b. The OS 12 includes the information processor 12a, BIOS (Basic Input/Output System) 12b, and utility applications 12c.

Note that the OS 12 is, for example, Windows OS. In fact, BIOS does not run on Windows OS. However, BIOS runs close together with Windows OS. So, FIG. 15 shows that the OS 12 includes BIOS, for convenience.

The general-purpose processor 13 is independent from the OS 11 and the OS 12. The general-purpose processor 13 executes various kinds of controls. According to this technology, the general-purpose processor 13 executes relayed communication between the OS 11 and the OS 12, holds a function list (described later), and transfers the function list, for example. Further, the general-purpose processor 13 has a startup-control function (startup controller) for starting an OS, which is not running.

The BIOS 12b is a program group for controlling peripheral devices such as a disk drive, a keyboard, and a video card connected to the computer. In general, the BIOS 12b is recorded in a nonvolatile memory such as a flash memory mounted on a motherboard. It is possible to update the latest content in the BIOS 12b.

The utility applications 12c are application software designed for particular purposes. For example, the utility applications 12c compensate for functions installed in the OSs and other application software, to thereby increase their functions, performance, and operability. Examples of functions of the utility applications 12c include file compression, getting rid of computer virus, memory management, screen saver, and the like.

Here, the television controller 11a sends/receives commands to/from the general-purpose processor 13 (two-way communication) by means of a synchronous serial communication such as UART (Universal Asynchronous Receiver Transmitter). Further, the television controller 11a receives remote-control commands from the remote-control light-receiving section 3 by means of UART.

The information processor 12a sends/receives commands to/from the general-purpose processor 13 (two-way communication) by means of LPC (Local Procedure Call) or the like. Note that LPC is a method of calling a program by another program, both of which are running on one PC independently.

Further, the information processor 12a receives remote-control commands from the remote-control light-receiving section 3 via a USB (Universal Serial Bus) or the like.

Meanwhile, the general-purpose processor 13 sends signals for determining destinations of remote-control commands to the remote-control light-receiving section 3 via GPIO (General Purpose Input/Output). Note that GPIO is a general-purpose input/output port, which may be used for various purposes under various settings.

According to this control system, the television controller 11a (TV system) sends/receives commands to/from the information processor 12a (PC system). As a result, the television controller 11a (TV system) cooperates with the information processor 12a (PC system). Note that the general-purpose processor 13 executes power-supply control for the PC system and other controls. The general-purpose processor 13 is running when the PC system is turned off.

Next, how the control system behaves in a case of selecting a menu item from the integrated function menu 20 will be described with reference to sequence diagrams.

Figure 16:
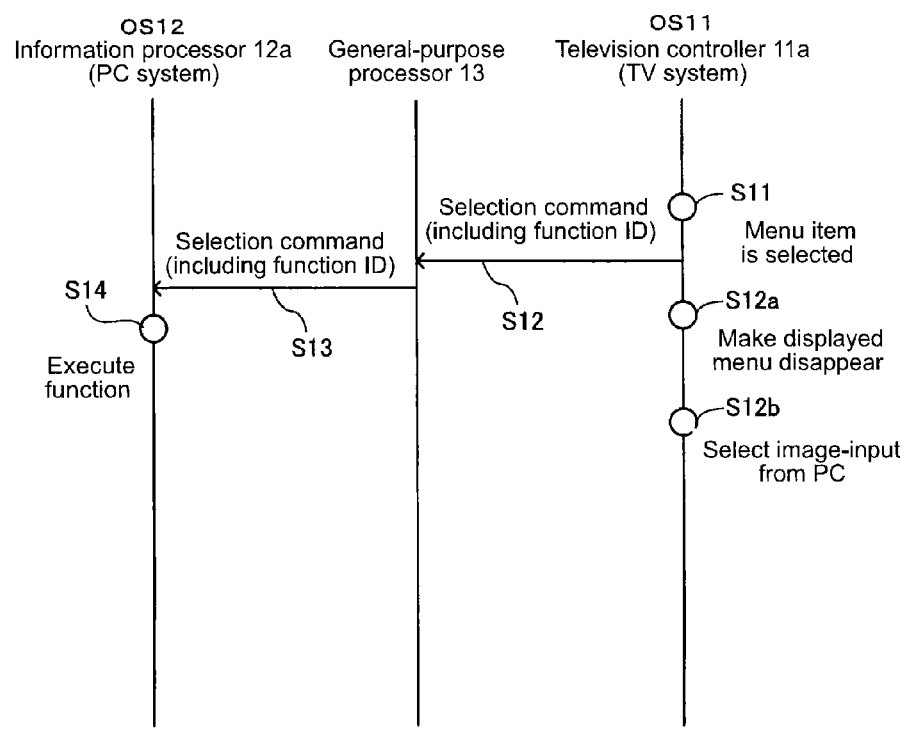
FIG. 16 is a diagram showing an operation sequence in a case of selecting a menu item.

FIG. 16 is a diagram showing an operation sequence in a case of selecting a menu item. Note that FIG. 16 shows an operation sequence of the pattern A (FIG. 12).

[S11] A menu item is selected on the OS 11.

[S12] The television controller 11a (TV system) sends a selection command (including function ID) to the general-purpose processor 13.

[S12a] The OS 11 makes the displayed menu disappear from the screen. Specifically, the television controller 11a controls the input-selecting/image-superimposing section 11b to make the displayed menu disappear from the screen.

[S12b] The OS 11 selects image-input from the PC.

[S13] The general-purpose processor 13 sends the received selection command to the information processor 12a (PC system) of the OS 12.

[S14] The information processor 12a (PC system) executes an appropriate function based on the received selection command.

Figure 17:
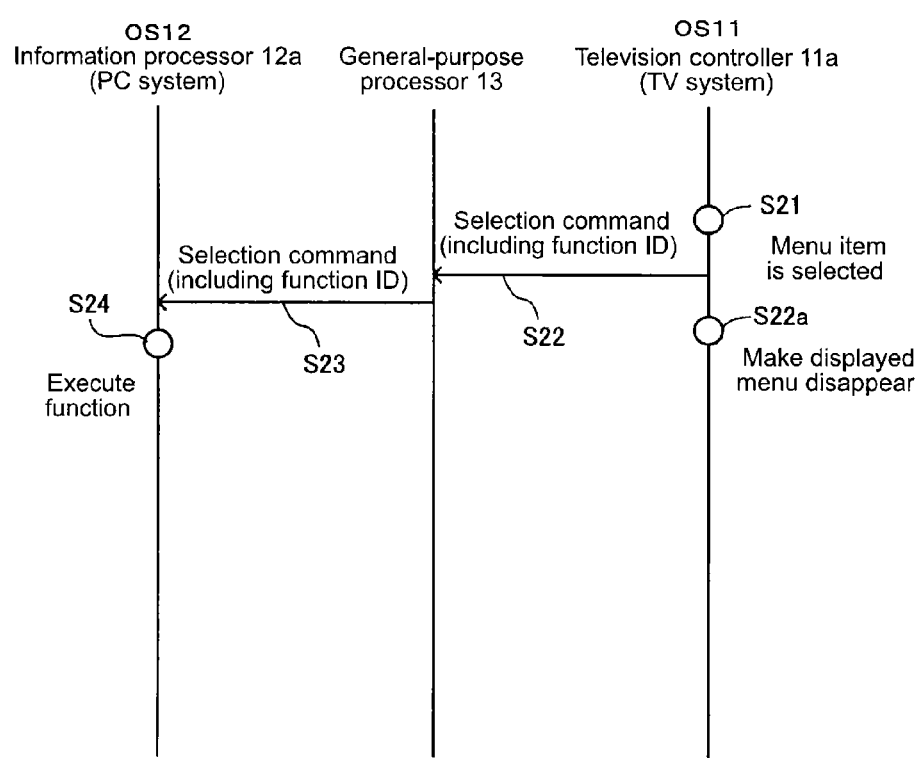
FIG. 17 is a diagram showing an operation sequence in a case of selecting a menu item.

FIG. 17 is a diagram showing an operation sequence in a case of selecting a menu item. Note that FIG. 17 shows an operation sequence of the pattern B (FIG. 12).

[S21] A menu item is selected on the OS 11.

[S22] The television controller 11a (TV system) sends a selection command (including function ID) to the general-purpose processor 13.

[S22a] The OS 11 makes the displayed menu disappear from the screen.

[S23] The general-purpose processor 13 sends the received selection command to the information processor 12a (PC system) of the OS 12.

[S24] The information processor 12a (PC system) executes an appropriate function based on the received selection command.

Figure 18:
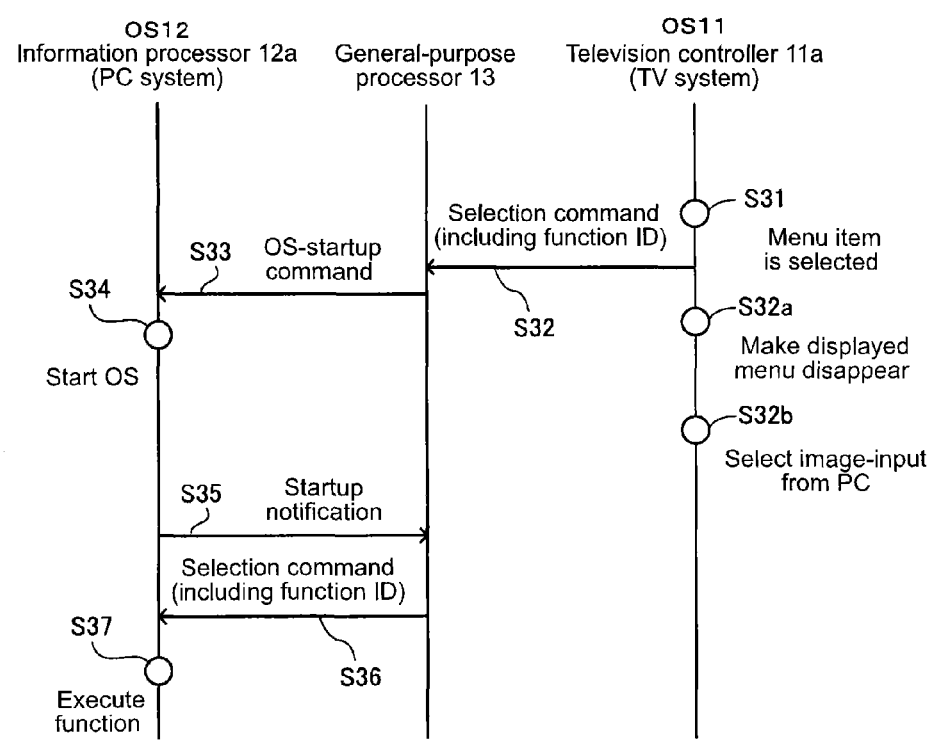
FIG. 18 is a diagram showing an operation sequence in a case of selecting a menu item.

FIG. 18 is a diagram showing an operation sequence in a case of selecting a menu item. Note that FIG. 18 shows an operation sequence of the pattern C (FIG. 12).

[S31] A menu item is selected on the OS 11.

[S32] The television controller 11a (TV system) sends a selection command (including function ID) to the general-purpose processor 13.

[S32a] The OS 11 makes the displayed menu disappear from the screen.

[S32b] The OS 11 selects image-input from the PC.

[S33] The general-purpose processor 13 sends an OS-startup command to the information processor 12a (PC system) of the OS 12.

[S34] The information processor 12a (PC system) starts the OS based on the received OS-startup command.

[S35] The information processor 12a (PC system) sends a startup notification to the general-purpose processor 13.

[S36] The general-purpose processor 13 sends the received selection command (Step S32) to the information processor 12a (PC system) of the OS 12.

[S37] The information processor 12a (PC system) executes an appropriate function based on the received selection command.

Figure 19:
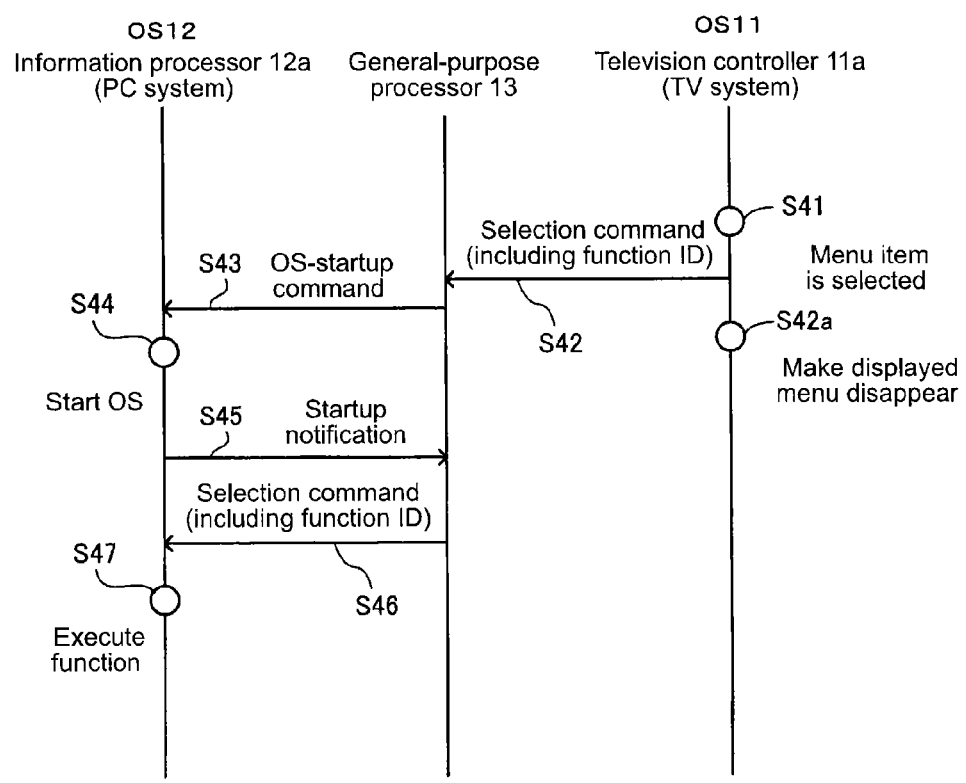
FIG. 19 is a diagram showing an operation sequence in a case of selecting a menu item.

FIG. 19 is a diagram showing an operation sequence in a case of selecting a menu item. Note that FIG. 19 shows an operation sequence of the pattern D (FIG. 12).

[S41] A menu item is selected on the OS 11.

[S42] The television controller 11a (TV system) sends a selection command (including function ID) to the general-purpose processor 13.

[S42a] The OS 11 makes the displayed menu disappear from the screen.

[S43] The general-purpose processor 13 sends an OS-startup command to the information processor 12a (PC system) of the OS 12.

[S44] The information processor 12a (PC system) starts the OS based on the received OS-startup command.

[S45] The information processor 12a (PC system) sends a startup notification to the general-purpose processor 13.

[S46] The general-purpose processor 13 sends the received selection command (Step S42) to the information processor 12a (PC system) of the OS 12.

[S47] The information processor 12a (PC system) executes an appropriate function based on the received selection command.

Figure 20:
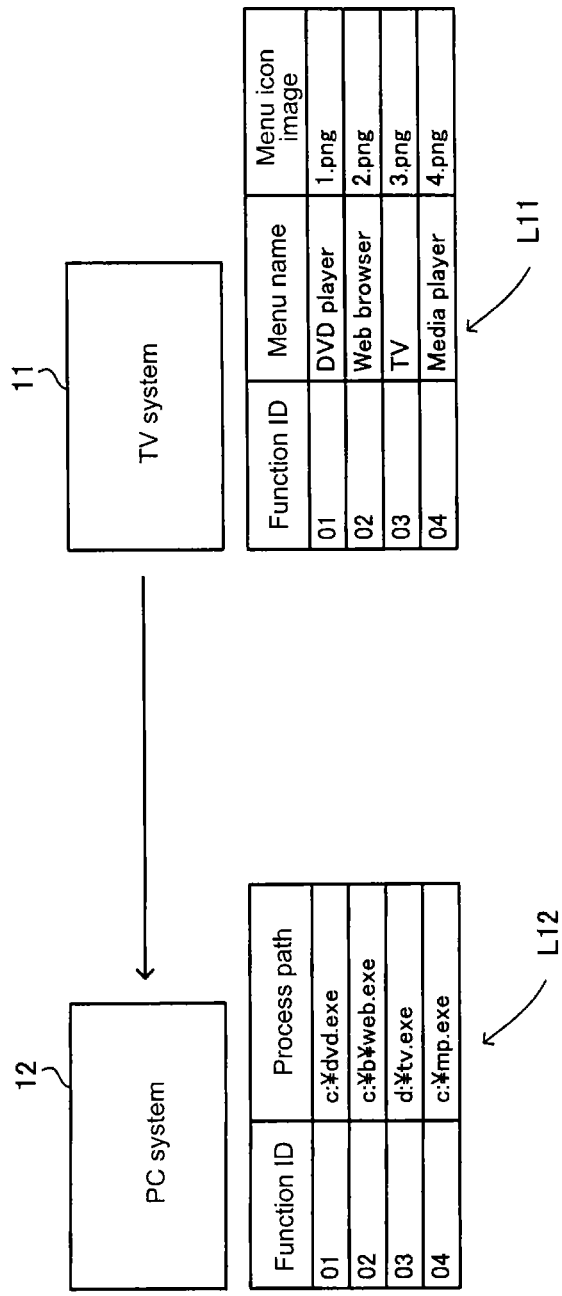
FIG. 20 is a diagram showing a function list.

Next, function IDs and function lists, which are included in the selection commands, will be described. FIG. 20 is a diagram showing the function lists.

The OS 11 has a function list, and the OS 12 has a function list. The OS 11 has a function list L1. In the function list L1, for example, "function ID=01" is set to the menu name "DVD player" and the menu icon image "1.png". "Function ID=02" is set to the menu name "Web browser" and the menu icon image "2.png".

Further, "function ID=03" is set to the menu name "TV" and the menu icon image "3.png". "Function ID=04" is set to the menu name "Media player" and the menu icon image "4.png".

Meanwhile, the OS 12 has a function list L2. In the function list L2, for example, "function ID-01" is set to the process path "c:¥dvd.exe". "Function ID=02" is set to the process path "c:¥b¥web.exe". "Function ID=03" is set to the process path "d:¥tv.exe". "Function ID=04" is set to the process path "c:¥mp.exe".

The OS 11 previously has the function list L1 in its system. The OS 12 previously has the function list L2 in its system. The OS 11 calls a function installed in the OS 12, by designating a function ID. The OS 12 calls a function installed in the OS 11, by designating a function ID.

Next, controls in a case where it takes time to start an OS will be described. In a case where an OS is started and a selected function is started (the above patterns C, D), it may take time to start the OS.

Specifically, a user has enjoyed a function running on an OS until just before another function, which runs on another OS, is selected (pattern C). In this case, the user wishes to keep on using the last function until just before the other OS is started.

Figure 21:
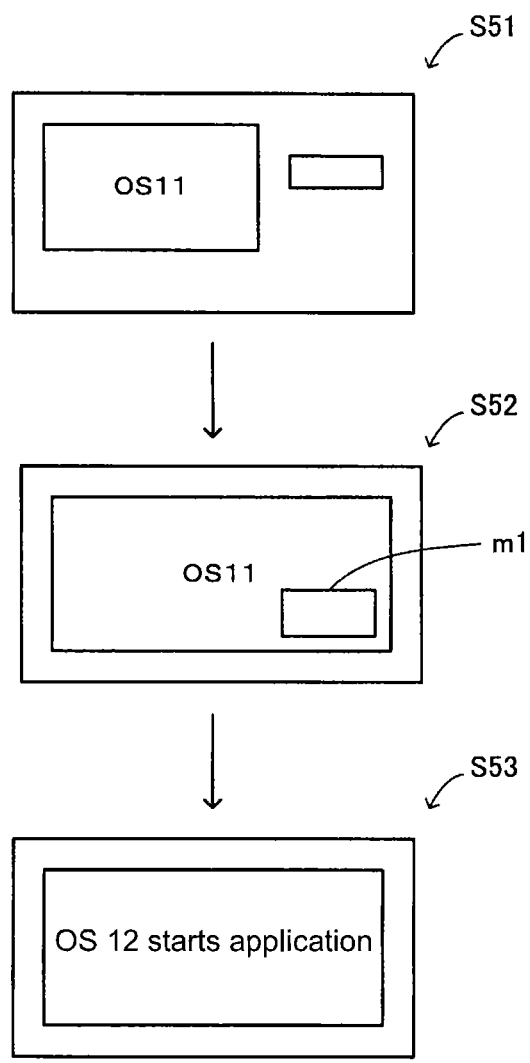
FIG. 21 is a diagram showing controls in a case where it takes time to start an OS.
Figure 22:
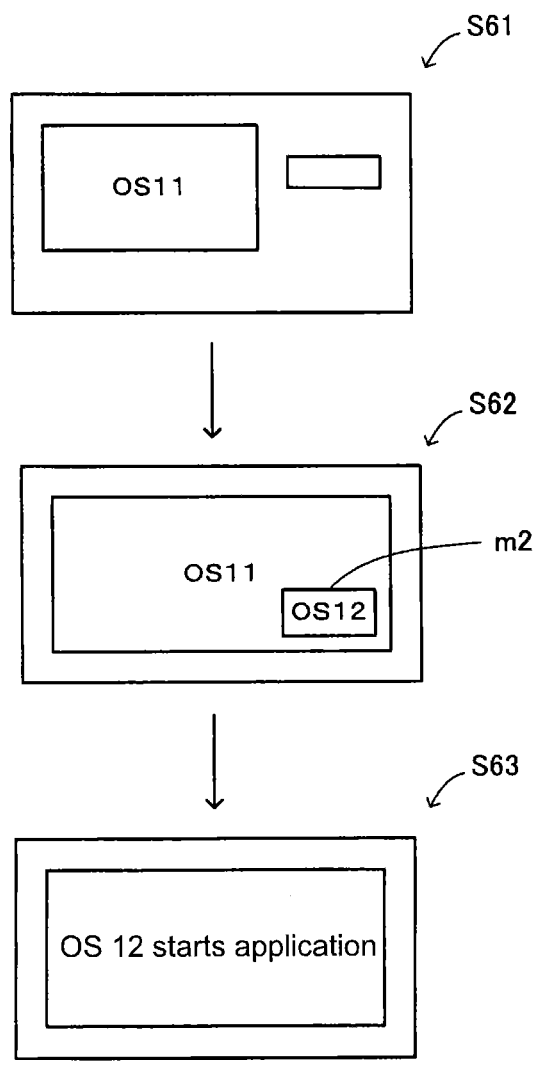
FIG. 22 is a diagram showing controls in a case where it takes time to start an OS.

For example, a DVD player is started on the PC when a user is watching TV. In this case, a user wishes to keep on watching TV until the PC is started, and thus has less stress. Further, a message that the selected OS is being started is displayed for the user, which further increases user-friendliness. FIG. 21 and FIG. 22 show such controls.

FIG. 21 is a diagram showing controls in a case where it takes time to start an OS.

[S51] The OS 11 inputs a currently-displayed image. A function installed in the OS 12 is selected.

[S52] An application starts on the OS 12. At this time, a message m1 is displayed on a window for the OS 11. The message m1 says that the OS 12 is being started.

[S53] The OS 12 is started. The image input from the OS 11 disappears. An image input from the OS 12 is selected. Then, the image input from the OS 12 is displayed.

As described above, a function installed in the OS 12 is selected when an image of the OS 11 is displayed. In this case, the image of the OS 11 is displayed until just before the OS 12 is started. In addition, the OS 12 displays the message m1 on the image of the OS 11. The message m1 says that the OS 12 is being started.

As a result, a user is capable of enjoying the current image of an OS until just before the selected OS is started. In addition, the user is capable of recognizing that the selected OS is being started. As a result, the user is capable of easily recognizing which function installed in which OS is being started, while the user is watching GUIs showing seamless transition between different OSs.

FIG. 22 is a diagram showing controls in a case where it takes time to start an OS.

[S61] The OS 11 inputs a currently-displayed image. A function installed in the OS 12 is selected.

[S62] An application starts on the OS 12. At this time, a dual-window display function is used. An image of the OS 12, which is being started, is output on a sub-window m2.

[S63] The OS 12 is started. The image input from the OS 11 disappears. An image input from the OS 12 is selected. Then, the image input from the OS 12 is displayed.

Figure 23:
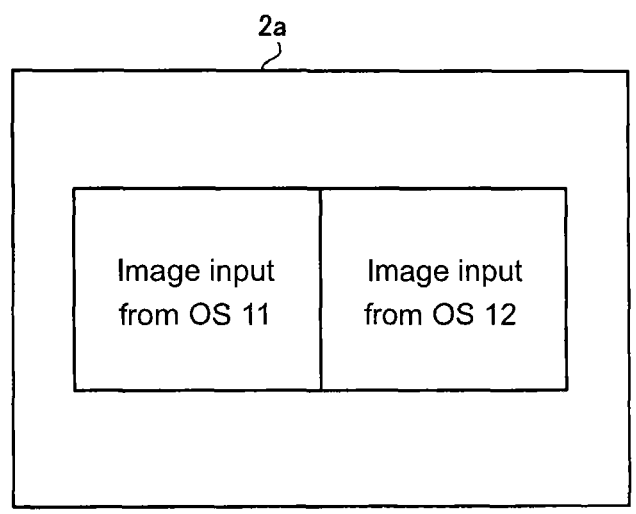
FIG. 23 is a diagram showing an example of dual-window display.
Figure 24:
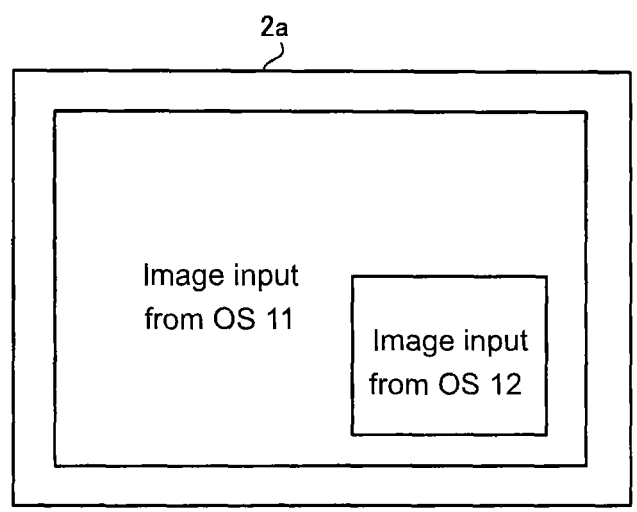
FIG. 24 is a diagram showing an example of dual-window display.

FIG. 23 is a diagram showing an example of dual-window display. FIG. 24 is a diagram showing an example of dual-window display. In FIG. 23, an image of the OS 11 and an image of the OS 12 are displayed side by side on the image display panel 2a. Note that the image size may be changed arbitrarily.

In FIG. 24, an image of the OS 11 and an image of the OS 12 are displayed on the image display panel 2a. Specifically, the image of the OS 11 is in the image of the OS 12 (picture-in-picture). Note that the display area and the image size may be changed arbitrarily.

As described above, a function installed in the OS 12 is selected when an image of the OS 11 is displayed. In this case, the image of the OS 11 is displayed until just before the OS 12 is started. In addition, the sub-window m2 is displayed on the image of the OS 11. The sub-window m2 displays an image showing that the OS 12 is being started.

As a result, a user is capable of enjoying the current image of an OS until just before the selected OS is started. In addition, the user is capable of recognizing that the selected OS is being started. As a result, the user is capable of easily recognizing which function installed in which OS is being started, while the user is watching GUIs showing seamless transition between different OSs.

Next, how the control system behaves in a case where it takes time to start an OS will be described with reference to sequence diagrams.

Figure 25:
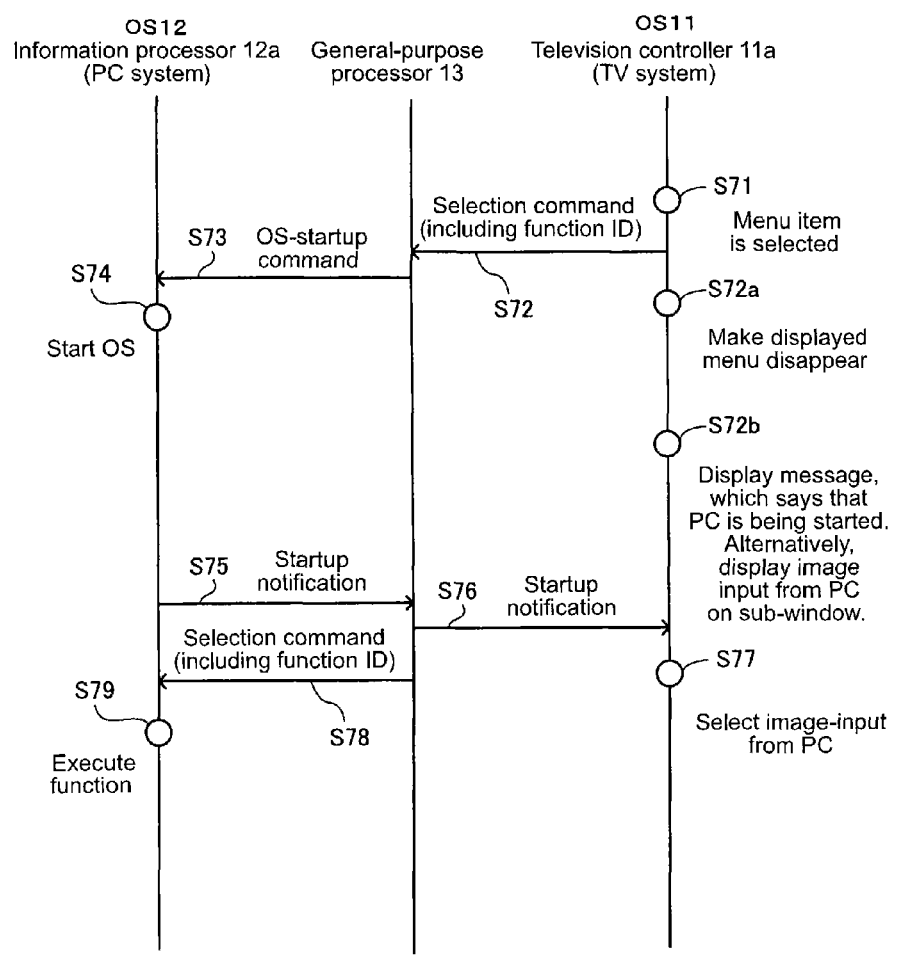
FIG. 25 is a diagram showing an operation sequence of the control system in a case where it takes time to start an OS.

FIG. 25 is a diagram showing an operation sequence of the control system in a case where it takes time to start an OS. Note that FIG. 25 shows an operation sequence of the pattern C (FIG. 12).

[S71] A menu item is selected on the OS 11.

[S72] The television controller 11a (TV system) sends a selection command (including function ID) to the general-purpose processor 13.

[S72a] The OS 11 makes the displayed menu disappear from the screen.

[S72b] The OS 11 displays a message, which says that the PC is being started. Alternatively, the OS 11 displays an image input from the PC on a sub-window.

[S73] The general-purpose processor 13 sends an OS-startup command to the information processor 12a (PC system) of the OS 12.

[S74] The information processor 12a (PC system) starts the OS based on the received OS-startup command.

[S75] The information processor 12a (PC system) sends a startup notification to the general-purpose processor 13.

[S76] The general-purpose processor 13 sends the startup notification to the television controller 11a (TV system).

[S77] The OS 11 selects image-input from the PC.

[S78] The general-purpose processor 13 sends the received selection command (Step S72) to the information processor 12a (PC system) of the OS 12.

[S79] The information processor 12a (PC system) executes an appropriate function based on the received selection command.

As described above, in a case where it takes time to start an OS, an image of the current OS is displayed until just before a selected OS is started.

Then, after the selected OS is being started, a message is displayed. The message says that the selected OS is being started. Alternatively, the current OS and the selected OS are displayed (dual-window display). As a result, a user does not have to wait for start of the next OS, which relieves the user's stress.

Next, increase and decrease of menu items will be described. Windows is applied to the OS 12. A user feels free to add/delete functions (applications) to/from Windows or another OS. In a case where such an OS is used in the control system, a user may delete functions in a menu.

Further, a user or the like may feel free to select functions to be mounted on a Windows PC product when shipping, according to preference of the user or according to SKU (stock-keeping unit).

In view of the above, the integrated function menu 20 according to this technology has a scheme of flexibly increasing/decreasing items displayed on a menu according to the current status of functions installed in an OS. Hereinafter, a case where the number of applications installed in the OS 12 (Windows) is increased/decreased will be described.

[Step 1] Every time the OS 12 is started, the OS 12 confirms functions (applications) installed in the OS 12. The OS 12 sets the functions installed in the OS 12 in a function list. The OS 12 writes the function list in the general-purpose processor 13. The general-purpose processor 13 holds the values.

[Step 2] At a time when displaying a menu, the OS 11 requests the general-purpose processor 13 for the function list of functions installed in the OS 12. The OS 11 determines functions installed in the OS 12 to be displayed on a menu based on the function list.

Note that the OS 12 may not only confirm functions (Step 1) every time the OS 12 is started, but also regularly confirm functions when the OS 12 is running, for example. Alternatively, the OS 12 may monitor an operation of deleting an application by a user, and may confirm functions after that.

Further, in Step 2, the OS 11 requests for the function list at a time when displaying a menu. Alternatively, the OS 11 may regularly request for the function list when the OS 12 is running. The OS 11 may not request for the function list every time when displaying a menu. Alternatively, the OS 11 may store the lists in a cache for a predetermined time period and use the lists.

Figure 26:
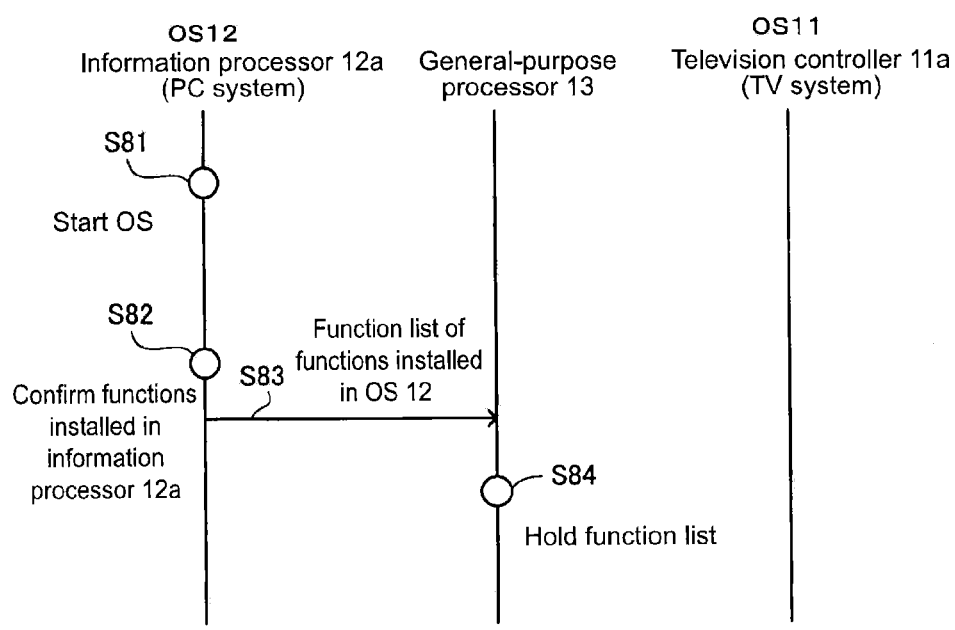
FIG. 26 is a diagram showing an operation sequence of control of the menu items.

Next, a sequence of controlling the menu items will be described. FIG. 26 is a diagram showing an operation sequence of control of the menu items. FIG. 26 shows an operation sequence by the control system in Step 1.

[S81] The information processor 12*a* (PC system) of the OS 12 starts the OS.

[S82] The information processor 12*a* (PC system) confirms functions installed in the information processor 12*a* (PC system).

[S83] The information processor 12*a* (PC system) sends a function list of the functions installed in the OS 12 to the general-purpose processor 13.

[S84] The general-purpose processor 13 holds the function list.

Figure 27:
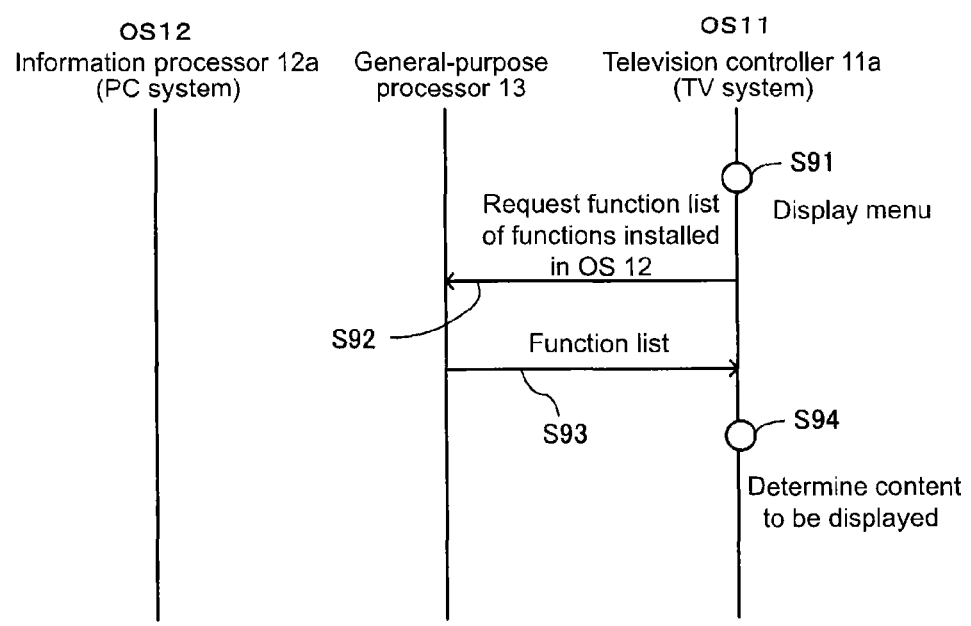
FIG. 27 is a diagram showing an operation sequence of control of the menu items.

FIG. 27 is a diagram showing an operation sequence of control of the menu items. FIG. 27 shows an operation sequence by the control system in Step 2.

[S91] The television controller 11*a* (TV system) of the OS 11 displays a menu (change menu display).

[S92] The television controller 11*a* requests the general-purpose processor 13 to send a function list of functions installed in the OS 12.

[S93] The general-purpose processor 13 sends the function list to the television controller 11*a*.

[S94] The television controller 11*a* receives the function list. The television controller 11*a* determines content to be displayed based on the received function list.

As described above, the OS 12 confirms functions (applications) of the OS 12. The OS 12 sets the functions installed in the OS 12 in a function list. The OS 11 determines the functions installed in the OS 12 to be displayed on the integrated function menu 20, based on the function list.

In general, functions installed in a PC are replaced frequently, in many cases. However, according to the above-mentioned controls, it is possible to flexibly add/delete the replaced functions to/from a menu, in response to the replacement. It is also possible to display the replaced functions on the integrated function menu 20.

Figure 28:
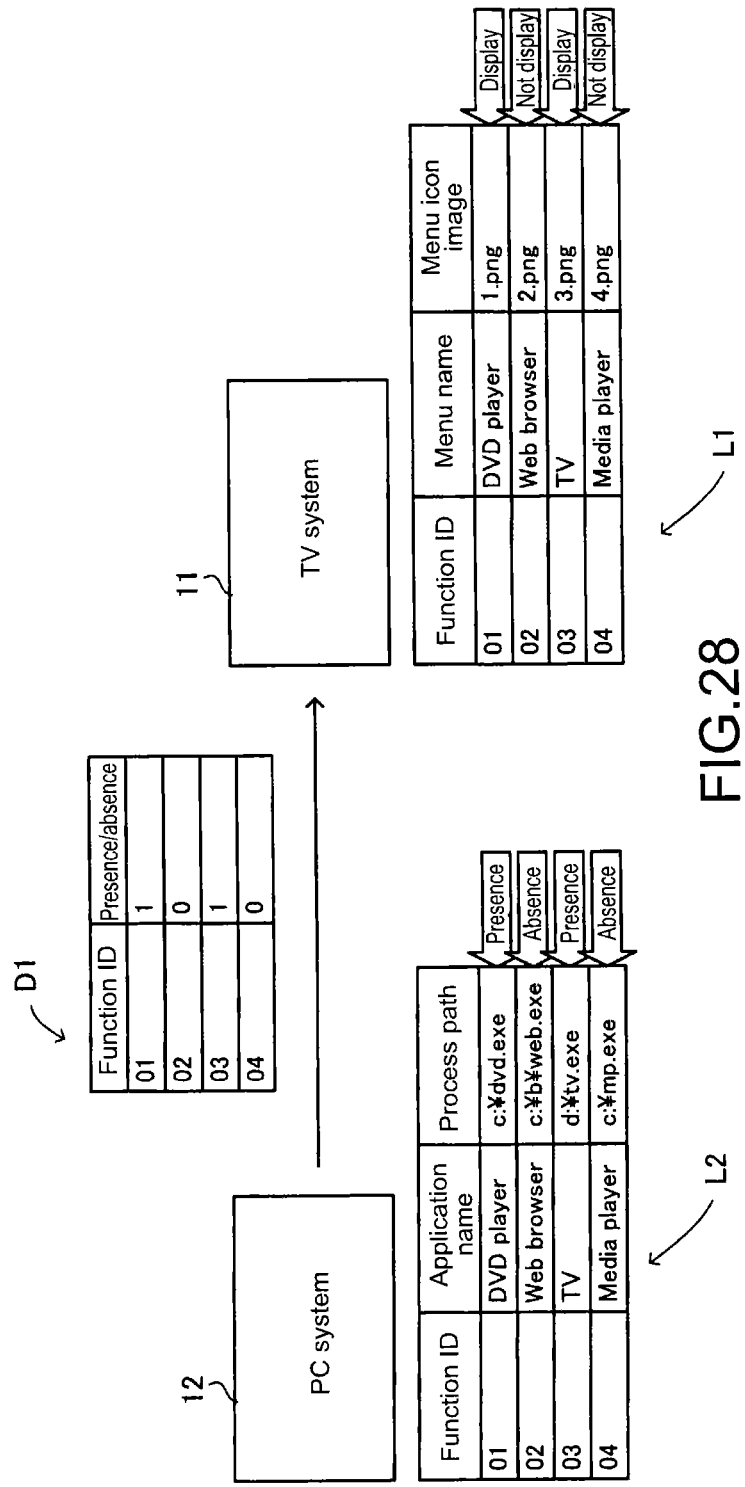
FIG. 28 is a diagram showing notification of content of a function list.

Next, notification of content of a function list will be described. FIG. 28 is a diagram showing notification of content of a function list. The television controller 11*a* of the OS 11 has a function list L1. The information processor 12*a* (PC system) of the OS 12 has a function list L2.

Meanwhile, a function presence/absence list data D1 includes "function ID" and "presence/absence" attribute. The "presence/absence" attribute indicates whether or not the OS 12 has a function corresponding to the function ID.

In the case of FIG. 28, the information processor 12*a* has items of "function IDs=01, 03". However, the information processor 12*a* does not have items of "function IDs=02, 04".

In this case, in the function presence/absence list data D1, "1" is registered for "function ID=01". "0" is registered for "function ID=0238". "1" is registered for "function ID-0338". "0" is registered for "function ID=04" ("1" means presence, and "0" means absence).

Then, the function presence/absence list data D1 is sent to the television controller 11*a*. Then, the OS 11 displays "function ID-01, 03", and does not display "function ID=02, 04".

Here, there may be various kinds of content of a function list exchanged between the systems. In the above-mentioned case, both the systems previously have correspondence lists of function IDs and function items. In this case, the lightweight function presence/absence list data D1 is exchanged. In the function presence/absence list data D1, presence/absence of function items of the respective function IDs are defined.

As described above, the lightweight function presence/absence list data D1 is exchanged. As a result, it is possible to reduce processing loads for the OS 11 and the OS 12.

Figure 29:
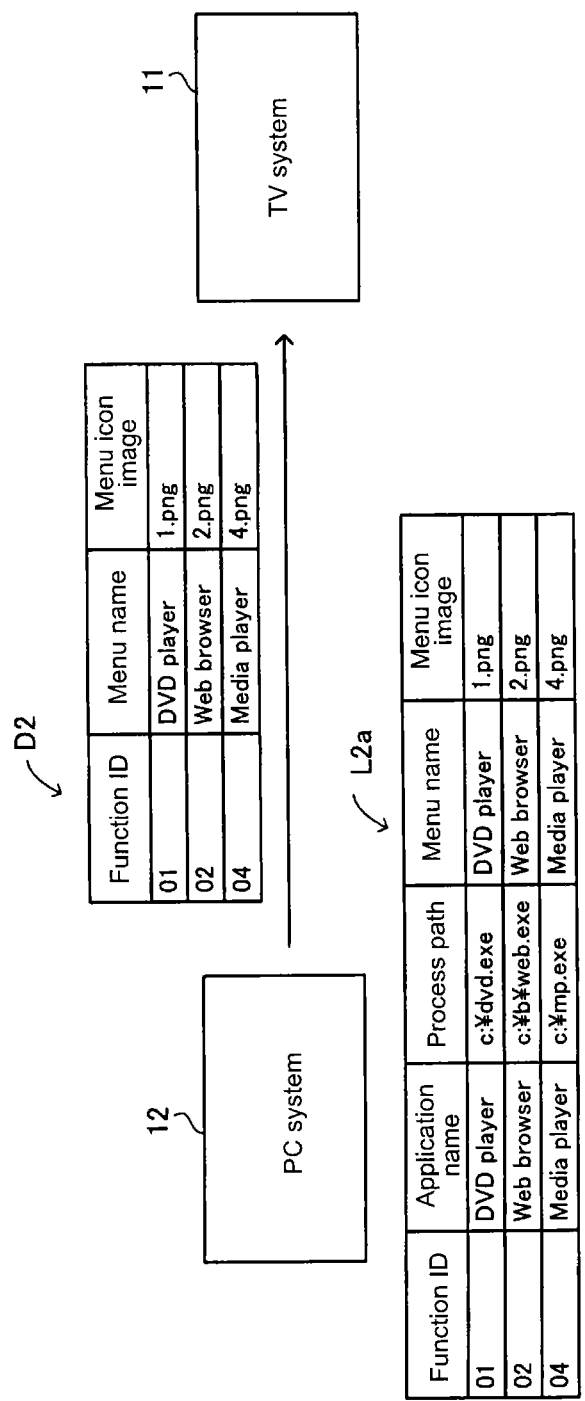
FIG. 29 is a diagram showing notification of content of a function list.

Next, an expanded operation in a case of notification of content of a function list will be described. FIG. 29 is a diagram showing notification of content of a function list. The information processor 12*a* has a function list L2*a*. In the function list L2*a*, for example, "function ID=01" is set to information having the application name "DVD player", the process path "c:¥dvd.exe", the menu name "DVD player", and the menu icon image "1.png".

Further, "function ID=02" is set to information having the application name "Web browser", the process path "c:¥b¥web.exe", the menu name "Web browser", and the menu icon image "2.png".

Further, "function ID=04" is set to information having the application name "Media player", the process path "c:¥mp.exe", the menu name "Mediaplayer", and the menu icon image "4.png".

A function ID and data on a predetermined function item are arbitrarily selected from the function list L2*a*. As a result, a function list data D2 is created. The OS 12 sends the function list data D2 to the OS 11.

Specifically, the structure of the function list data D2 is as follows. The menu name "DVD player" and the menu icon image "1.png" are set to "function ID-01". The menu name "Web browser" and the menu icon image "2.png" are set to the "function ID=02". The menu name "Media player" and the menu icon image "4.png" are set to "function ID=04".

In the method described with reference to FIG. 28, both the OS 11 and the OS 12 previously have function lists, respectively. In this method, functions (applications), which are newly installed in the OS 12 by a user, may not be added.

In view of this, in the method of FIG. 29, the OS 11 does not have a fixed function list previously. The OS 12 sends the function list data D2 to the OS 11. The OS 11 receives the function list data D2. The function list data D2 includes text data, image data, and other data, which are necessary to display the effective function list and menu.

As a result, it is possible to flexibly add functions, which are newly installed in the OS 12 by a user, to the OS 11 side. Note that, in this method, the amount of exchanged data is increased. However, a user may easily add function items to be displayed on a menu, if a GUI for editing a list and data is provided to a user.

As described above, the information processing apparatus 1 is a composite-system including an OS for television and an OS for PC. The information processing apparatus 1 has a seamless GUI. According to the seamless GUI, it is possible to seamlessly start or change an application running on the OS for television and an application running on the OS for PC, without distinction.

The information processing apparatus 1 is capable of superimposing a GUI on an image, which another OS renders and outputs. According to this function, it is possible to always start or change arbitrary functions installed in both the OSs during operation of a system very easily by means of a uniform method.

Note that this technology may employ the following configurations.

(1) An information processing apparatus, comprising:
    a first operating system configured to execute a first function;
    a second operating system configured to execute a second function; and
    a display controller configured
        to select one of first image information and second image information, the first image information being based on execution of the first function, the second image information being based on execution of the second function, or
        to superimpose one of the first image information and the second image information on the other information, and
        to display one of the selected information and the superimposed information on a display unit, wherein
    the display controller is configured to display one menu when one of the first operating system and the second operating system is running, one of first icon and second icon being selectable from the menu, the first icon indicating start of the first function, the second icon indicating start of the second function.

(2) The information processing apparatus according to (1), wherein
    the display controller is configured
        to display, in a case where the first icon is selected, the first image information based on execution of the first function, and
        to display, in a case where the second icon is selected, the second image information based on execution of the second function.

(3) The information processing apparatus according to (1) or (2), further comprising
    a startup controller configured to start the second operating system in a case where the second operating system is not running, wherein
    the display controller is configured
        to select, in a case where the second icon is selected, the second image information based on execution of the second function, at a predetermined timing after the startup controller starts the second operating system, and
        to display the second image information.

(4) The information processing apparatus according to any one of (1) to (3), further comprising
    a startup controller configured to start the second operating system in a case where the second operating system is not running, wherein
    the display controller is configured
        to superimpose, in a case where the second icon is selected, the second image information on the first image information, after the startup controller starts the second operating system and until a predetermined timing,
        to display the superimposed image information,
        to select the second image information after the predetermined timing, and
        to display the selected second image information.

(5) The information processing apparatus according to any one of (1) to (4), wherein
    the display controller is configured to display, in a case where one of the first image information and the second image information is shifted to the other image information, display-selection information, the display-selection information notifying that the image information is shifted.

(6) The information processing apparatus according to any one of (1) to (5), wherein
    the first operating system fails to have a fixed list of the first function, and is configured
        to receive a list of the first function, the list being sent from the second operating system, and
        to update the list every time the first operating system receives the list.

(7) The information processing apparatus according to any one of (1) to (6), wherein
    the second operating system is configured to set which second function is installed in the second operating system and which second function is not installed in the second operating system in a function list, and
    the first operating system is configured
        to refer to the function list, and
        to determine the second function to be displayed on the menu.

(8) A display control method, comprising:
    selecting one of first image information and second image information, the first image information being based on execution of the first function by a first operating system, the second image information being based on execution of the second function by a second operating system, or
    superimposing one of the first image information and the second image information on the other information;
    displaying one of the selected information and the superimposed information on a display unit; and
    displaying one menu when one of the first operating system and the second operating system is running, one of first icon and second icon being selectable from the menu, the first icon indicating start of the first function, the second icon indicating start of the second function.

(9) The information processing method according to (8), further comprising:
    displaying, in a case where the first icon is selected, the first image information based on execution of the first function; and
    displaying, in a case where the second icon is selected, the second image information based on execution of the second function.

(10) The information processing method according to (8) or (9), further comprising:
    starting the second operating system in a case where the second operating system is not running;
    selecting, in a case where the second icon is selected, the second image information based on execution of the second function, at a predetermined timing after the startup controller starts the second operating system; and
    displaying the second image information.

(11) The information processing method according to any one of (8) to (10), further comprising:
    starting the second operating system in a case where the second operating system is not running;
    superimposing, in a case where the second icon is selected, the second image information on the first image information, after the startup controller starts the second operating system and until a predetermined timing;
    displaying the superimposed image information;

selecting the second image information after the predetermined timing; and
displaying the selected second image information.

(12) The information processing method according to any one of (8) to (11), further comprising
displaying, in a case where one of the first image information and the second image information is shifted to the other image information, display-selection information, the display-selection information notifying that the image information is shifted.

(13) The information processing method according to any one of (8) to (12), further comprising:
receiving, by the first operating system, a list of the first function, the list being sent from the second operating system, the first operating system failing to have a fixed list of the first function; and
updating the list every time the first operating system receives the list.

(14) The information processing method according to any one of (8) to (13), further comprising:
setting, by the second operating system, which second function is installed in the second operating system and which second function is not installed in the second operating system in a function list; and
referring, by the first operating system, to the function list, and determining the second function to be displayed on the menu.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-000679 filed in the Japan Patent Office on Jan. 5, 2012, the entire content of which is hereby incorporated by reference.

What is claimed is:

1. An information processing apparatus, comprising:
circuitry configured to
select one of first image information and second image information, the first image information based on execution of a first function by a first operating system, the second image information based on execution of a second function by a second operating system, or
superimpose one of the first image information and the second image information on the other of the first image information and the second image information;
display one of the selected image information and the superimposed image information on a display;
display on the display a menu, when one of the first operating system and the second operating system is running, and one of a first icon and a second icon that are selectable from the menu, the first icon indicating start of the first function and the second icon indicating start of the second function; and
display a display-selection information on the display when one of the first image information and the second image information is shifted to the other of the first image information and the second image information, the display-selection information notifying that the image information is shifted.

2. The information processing apparatus according to claim 1, wherein the circuitry is further configured to
display, where when the first icon is selected, the first image information based on execution of the first function, and
display, when the second icon is selected, the second image information based on execution of the second function.

3. The information processing apparatus according to claim 2, wherein the circuitry is further configured to
start the second operating system when the second operating system is not running,
select, when the second icon is selected, the second image information based on execution of the second function, at a predetermined timing after the the second operating system is started, and
display the second image information.

4. The information processing apparatus according to claim 2, wherein the circuitry is further configured to
start the second operating system when the second operating system is not running,
superimpose, when the second icon is selected, the second image information on the first image information, after the second operating system is started and until a predetermined timing,
display the superimposed image information,
select the second image information after the predetermined timing, and
display the selected second image information.

5. The information processing apparatus according to claim 1, wherein the first operating system is configured to
receive a list of the first function from the second operating system, and
update the list when the first operating system receives the list from the second operating system.

6. The information processing apparatus according to claim 1, wherein
the second operating system is configured to set which second function is installed in the second operating system and which second function is not installed in the second operating system in a function list, and
the first operating system is configured
to refer to the function list, and
to determine the second function to be displayed on the menu.

7. A display control method, comprising:
selecting one of first image information and second image information, the first image information based on execution of a first function by a first operating system, the second image information based on execution of a second function by a second operating system, or
superimposing one of the first image information and the second image information on the other of the first image information and the second image information;
displaying one of the selected image information and the superimposed image information on a display;
displaying on the display a menu, when one of the first operating system and the second operating system is running, and one of a first icon and a second icon being selectable from the menu, the first icon indicating start of the first function and the second icon indicating start of the second function; and
displaying a display-selection information on the display when one of the first image information and the second image information is shifted to the other of the first image information and the second image information, the display-selection information notifying that the image information is shifted.

8. The information processing method according to claim 7, further comprising:
 displaying, when the first icon is selected, the first image information based on execution of the first function; and
 displaying, when the second icon is selected, the second image information based on execution of the second function.

9. The information processing method according to claim 8, further comprising:
 starting the second operating system when the second operating system is not running;
 selecting, when the second icon is selected, the second image information based on execution of the second function, at a predetermined timing after the second operating system is started; and
 displaying the second image information.

10. The information processing method according to claim 8, further comprising:
 starting the second operating system when the second operating system is not running;
 superimposing, when the second icon is selected, the second image information on the first image information, after the second operating system is started and until a predetermined timing;
 displaying the superimposed image information;
 selecting the second image information after the predetermined timing; and
 displaying the selected second image information.

11. The information processing method according to claim 7, further comprising:
 receiving, by the first operating system, a list of the first function from the second operating system; and
 updating the list when the first operating system receives the list from the second operating system.

12. The information processing method according to claim 7, further comprising:
 setting, by the second operating system, which second function is installed in the second operating system and which second function is not installed in the second operating system in a function list; and
 referring, by the first operating system, to the function list, and determining the second function to be displayed on the menu.

13. A non-transitory computer readable medium storing instructions that, when executed by a computer, cause the computer to perform a process, the process comprising:
 selecting one of first image information and second image information, the first image information based on execution of a first function by a first operating system, the second image information based on execution of a second function by a second operating system, or
 superimposing one of the first image information and the second image information on the other of the first image information and the second image information;
 displaying one of the selected image information and the superimposed image information on a display;
 displaying on the display a menu, when one of the first operating system and the second operating system is running, and one of a first icon and a second icon being selectable from the menu, the first icon indicating start of the first function and the second icon indicating start of the second function; and
 displaying a display-selection information on the display when one of the first image information and the second image information is shifted to the other of the first image information and the second image information, the display-selection information notifying that the image information is shifted.

14. The non-transitory computer readable medium according to claim 13, wherein the process further comprises:
 displaying, when the first icon is selected, the first image information based on execution of the first function; and
 displaying, when the second icon is selected, the second image information based on execution of the second function.

15. The non-transitory computer readable medium according to claim 14, wherein the process further comprises:
 starting the second operating system when the second operating system is not running;
 selecting, when the second icon is selected, the second image information based on execution of the second function, at a predetermined timing after the second operating system is started; and
 displaying the second image information.

16. The non-transitory computer readable medium according to claim 14, wherein the process further comprises:
 starting the second operating system when the second operating system is not running;
 superimposing, when the second icon is selected, the second image information on the first image information, after the second operating system is started and until a predetermined timing;
 displaying the superimposed image information;
 selecting the second image information after the predetermined timing; and
 displaying the selected second image information.

17. The non-transitory computer readable medium according to claim 13, wherein the process further comprises:
 receiving, by the first operating system, a list of the first function from the second operating system; and
 updating the list when the first operating system receives the list from the second operating system.

18. The non-transitory computer readable medium according to claim 13, wherein the process further comprises:
 setting, by the second operating system, which second function is installed in the second operating system and which second function is not installed in the second operating system in a function list; and
 referring, by the first operating system, to the function list, and determining the second function to be displayed on the menu.

19. The information processing apparatus according to claim 1, wherein the circuitry is further configured to translucently superimpose the one of the first image information and the second image information on the other of the first image information and the second image information.

20. The information processing method according to claim 7, further comprising translucently superimposing the one of the first image information and the second image information on the other of the first image information and the second image information.

* * * * *